(12) United States Patent
Suzuki et al.

(10) Patent No.: US 11,718,721 B2
(45) Date of Patent: Aug. 8, 2023

(54) HARD COAT FILM AND METHOD FOR PRODUCING SAME

(71) Applicant: NIPPON PAPER INDUSTRIES CO., LTD., Tokyo (JP)

(72) Inventors: Takeo Suzuki, Tokyo (JP); Narihiro Iio, Tokyo (JP); Takashi Ino, Tokyo (JP); Yusuke Sugiyama, Tokyo (JP); Yasuaki Yoshida, Tokyo (JP); Takuya Takahashi, Tokyo (JP)

(73) Assignee: NIPPON PAPER INDUSTRIES CO., LTD., Tokyo (JP)

( * ) Notice: Subject to any disclaimer, the term of this patent is extended or adjusted under 35 U.S.C. 154(b) by 0 days.

(21) Appl. No.: 16/964,758

(22) PCT Filed: Jan. 23, 2019

(86) PCT No.: PCT/JP2019/002017
§ 371 (c)(1),
(2) Date: Jul. 24, 2020

(87) PCT Pub. No.: WO2019/146622
PCT Pub. Date: Aug. 1, 2019

(65) Prior Publication Data
US 2021/0054159 A1 Feb. 25, 2021

(30) Foreign Application Priority Data

Jan. 26, 2018 (JP) ................... 2018-011583
Jan. 26, 2018 (JP) ................... 2018-011584
Jan. 26, 2018 (JP) ................... 2018-011585
Jan. 26, 2018 (JP) ................... 2018-011586
Jan. 26, 2018 (JP) ................... 2018-011587

(51) Int. Cl.
*B32B 27/30* (2006.01)
*C08J 7/04* (2020.01)
*C08J 7/043* (2020.01)
*B32B 27/08* (2006.01)
*B32B 27/32* (2006.01)
*C08J 7/18* (2006.01)

(52) U.S. Cl.
CPC ............... *C08J 7/042* (2013.01); *B32B 27/08* (2013.01); *B32B 27/308* (2013.01); *B32B 27/32* (2013.01); *C08J 7/043* (2020.01); *C08J 7/18* (2013.01); *B32B 2255/10* (2013.01); *B32B 2307/536* (2013.01); *B32B 2307/538* (2013.01); *B32B 2457/202* (2013.01); *B32B 2457/204* (2013.01); *C08J 2323/00* (2013.01); *C08J 2347/00* (2013.01)

(58) Field of Classification Search
CPC .................................................. B32B 27/325
See application file for complete search history.

(56) References Cited

U.S. PATENT DOCUMENTS

2010/0165460 A1 7/2010 Furui et al.
2018/0016405 A1* 1/2018 Matsuzaki ............... C08J 7/042

FOREIGN PATENT DOCUMENTS

| JP | 2004-284158 A | 10/2004 | |
|---|---|---|---|
| JP | 2005-281537 A | 10/2005 | |
| JP | 2013-142830 A | 7/2013 | |
| JP | 2016-187869 A | 11/2016 | |
| WO | 2008/020613 A1 | 2/2008 | |
| WO | 2012/066743 A1 | 5/2012 | |
| WO | WO-2016117706 A1 * | 7/2016 | ............. B32B 27/00 |

OTHER PUBLICATIONS

JP 2005-281537 Machine Translation (Year: 2005).*
JP 2004-284158 Machine Translation (Year: 2004).*
International Search Report for PCT/JP2019/002017 dated Apr. 2, 2019 (PCT/ISA/210).
Communication dated Mar. 25, 2022, issued by the Chinese Patent Office in Chinese application No. 201980009993.X.

* cited by examiner

*Primary Examiner* — Zachary M Davis
(74) *Attorney, Agent, or Firm* — Sughrue Mion, PLLC

(57) ABSTRACT

A hard coat film having excellent adhesion (particularly adhesion over time) to a hard coat layer when a cycloolefin polymer film is used as a base material. The hard coat film comprises a hard coat layer containing an ionizing radiation curable resin laminated on at least one surface of a cycloolefin polymer base film via a primer layer. The primer layer has an arithmetic average surface roughness (Ra) in the range of 0.5 nm to 15.0 nm, and a surface of the primer layer has a static friction coefficient in the range of 0.6 to 2.0.

4 Claims, No Drawings

HARD COAT FILM AND METHOD FOR PRODUCING SAME

CROSS REFERENCE TO RELATED APPLICATIONS

This application is a National Stage of International Application No. PCT/JP2019/002017 filed Jan. 23, 2019, claiming priorities based on Japanese Patent Application No. 2018-011583 filed Jan. 26, 2018, Japanese Patent Application No. 2018-011584 filed Jan. 26, 2018, Japanese Patent Application No. 2018-011585 filed Jan. 26, 2018, Japanese Patent Application No. 2018-011586 filed Jan. 26, 2018 and Japanese Patent Application No. 2018-011587 filed Jan. 26, 2018.

TECHNICAL FIELD

The present invention relates to a hard coat film used for optical members, and a method for producing the same. More specifically, the present invention relates to a hard coat film that can be used as a protective film for panel displays, such as electroluminescence (EL) display devices, liquid crystal display (LCD) devices, and plasma display devices; and display device components, such as touch panels.

BACKGROUND ART

For example, display surfaces of liquid crystal displays, such as liquid crystal display (LCD) devices, are required to have scratch resistance so that the surfaces are not damaged during handling to reduce the visibility. Therefore, it is common practice to impart scratch resistance to the display surfaces of displays using hard coat films obtained by providing hard coat layers on base films. In recent years, with the spread of touch panels that allow data and instructions to be input by touching with a finger, a pen, or the like while viewing the display on the display screen, functional requirements for hard coat films used for such optical members are further increasing.

Cycloolefin polymer films have excellent transparency, heat resistance, dimensional stability, low hygroscopicity, low birefringence, and optical isotropy as base films, and are thus expected to be applied to such optical members. It has been proposed to provide a hard coat layer on such cycloolefin films. However, the cycloolefin polymer films had a small number of polar groups on the film surface, unlike acrylic films or polyester films; thus, when the cycloolefin polymer films were used as base materials, there was a problem of inferior adhesion to hard coat layers.

Therefore, conventionally, Patent Literature 1, Patent Literature 2, and the like disclose methods for imparting, to cycloolefin polymer films, easy adhesion to hard coat layers.

CITATION LIST

Patent Literature

Patent Literature 1: JP2001-147304A
Patent Literature 2: JP2006-110875A

SUMMARY OF INVENTION

Technical Problem

Conventionally, Patent Literature 1 discloses corona treatment, plasma treatment, ultraviolet irradiation treatment, and the like as methods for imparting, to cycloolefin polymer films, easy adhesion to hard coat layers. However, these methods had problems in that the adhesion between the cycloolefin polymer films and the hard coat layers was insufficient, and in particular, that adhesion failure was likely to occur over time.

Further, Patent Literature 2 discloses a method of applying an anchor coating agent comprising an olefin resin to a cycloolefin polymer film. By means of this anchor coating treatment, the adhesion between the cycloolefin polymer film and the hard coat layer was improved to some extent, but was still insufficient. In particular, there was a problem in that adhesion failure was likely to occur over time. Furthermore, there was a problem in that cracks were likely to occur on the surface of the hard coat layer under heat-resistant conditions. Even when anchor coating treatment with such a specific material was performed, the improvement of the adhesion between the base film and the hard coat layer was insufficient.

Therefore, the conventional hard coat films had a major challenge in improving the adhesion, particularly adhesion over time, to hard coat layers when using cycloolefin polymer films as base materials.

Accordingly, an object of the present invention is to provide a hard coat film having excellent adhesion, particularly excellent adhesion over time, to a hard coat layer using a cycloolefin polymer film as a base material, and to also provide a method for producing the same.

Solution to Problem

In order to solve the above problems, the present inventors focused on laminating a hard coat layer on at least one surface of a cycloolefin polymer base film through a primer layer, and further focused on the surface properties of the primer layer to conduct extensive studies. As a result, the present inventors found that the above problems can be solved by using the following configurations.

That is, the present invention has the following configurations.

(First Invention)

A hard coat film comprising a hard coat layer containing an ionizing radiation curable resin laminated on at least one surface of a cycloolefin polymer base film via a primer layer.

(Second Invention)

The hard coat film according to the first invention, wherein the primer layer has an arithmetic average surface roughness (Ra) in the range of 0.5 nm to 15.0 nm, and a surface of the primer layer has a static friction coefficient in the range of 0.6 to 2.0.

(Third Invention)

The hard coat film according to the second invention, wherein the surface of the primer layer has a ratio of static friction coefficient to dynamic friction coefficient (static friction coefficient/dynamic friction coefficient) of 2.5 or less.

(Fourth Invention)

The hard coat film according to the second or third invention, wherein the primer layer has a surface free energy of 22 mN/m or more.

(Fifth Invention)

The hard coat film according to any one of the second to fourth inventions, wherein the surface of the primer layer has a water contact angle of 110 degrees or less.

(Sixth Invention)

The hard coat film according to any one of the second to fifth inventions, wherein the hard coat layer contains, as the ionizing radiation curable resin, a polyfunctional acrylate having three or more (meth)acryloyloxy groups per molecule.

(Seventh Invention)

A method for producing a hard coat film having a hard coat layer containing an ionizing radiation curable resin on a cycloolefin polymer base film via a primer layer, the method comprising:

applying a primer layer paint to the cycloolefin polymer base film, followed by drying to form a primer layer, wherein the primer layer has an arithmetic average surface roughness (Ra) in the range of 0.5 nm to 15.0 nm, and a surface of the primer layer has a static friction coefficient in the range of 0.6 to 2.0;

then applying a hard coat layer paint containing an ionizing radiation curable resin to the primer layer, followed by drying to form a hard coat layer; and then performing ionizing radiation irradiation.

(Eighth Invention)

The hard coat film according to the first invention, wherein the primer layer has an arithmetic average surface roughness (Ra) in the range of 0.5 nm to 15.0 nm.

(Ninth Invention)

The hard coat film according to the eighth invention, wherein a surface of the primer layer has a static friction coefficient in the range of 0.6 to 2.0.

(Tenth Invention)

The hard coat film according to the eighth or ninth invention, wherein the surface of the primer layer has a water contact angle of 110 degrees or less.

(Eleventh Invention)

The hard coat film according to any one of the eighth to tenth inventions, wherein the hard coat layer contains, as the ionizing radiation curable resin, a polyfunctional acrylate having three or more (meth)acryloyloxy groups per molecule.

(Twelfth Invention)

A method for producing a hard coat film having a hard coat layer containing an ionizing radiation curable resin on a cycloolefin polymer base film via a primer layer, the method comprising:

applying a primer layer paint to the cycloolefin polymer base film, followed by drying to form a primer layer, wherein the primer layer has an arithmetic average surface roughness (Ra) in the range of 0.5 nm to 15.0 nm;

then applying a hard coat layer paint containing an ionizing radiation curable resin to the primer layer, followed by drying to form a hard coat layer; and then performing ionizing radiation irradiation.

(Thirteenth Invention)

The hard coat film according to the first invention, wherein the primer layer has a surface free energy of 22 mN/m or more.

(Fourteenth Invention)

The hard coat film according to the thirteenth invention, wherein a surface of the primer layer has a water contact angle of 110 degrees or less.

(Fifteenth Invention)

The hard coat film according to the thirteenth or fourteenth invention, wherein the primer layer has an arithmetic average surface roughness (Ra) in the range of 0.5 nm to 15.0 nm (Sixteenth Invention)

The hard coat film according to any one of the thirteenth to fifteenth inventions, wherein the hard coat layer contains, as the ionizing radiation curable resin, a polyfunctional acrylate having three or more (meth)acryloyloxy groups per molecule.

(Seventeenth Invention)

A method for producing a hard coat film having a hard coat layer containing an ionizing radiation curable resin on a cycloolefin polymer base film via a primer layer, the method comprising:

applying a primer layer paint to the cycloolefin polymer base film, followed by drying to form a primer layer, wherein the primer layer has a surface free energy of 22 mN/m or more;

then applying a hard coat layer paint containing an ionizing radiation curable resin to the primer layer, followed by drying to form a hard coat layer; and then performing ionizing radiation irradiation.

(Eighteenth Invention)

The hard coat film according to the first invention, wherein a surface of the primer layer has a static friction coefficient in the range of 0.6 to 2.0.

(Nineteenth Invention)

The hard coat film according to the eighteenth invention, wherein the primer layer has a surface free energy of 22 mN/m or more.

(Twentieth Invention)

The hard coat film according to the eighteenth or nineteenth invention, wherein the surface of the primer layer has a water contact angle of 110 degrees or less.

(Twenty-First Invention)

The hard coat film according to any one of the eighteenth to twentieth inventions, wherein the hard coat layer contains, as the ionizing radiation curable resin, a polyfunctional acrylate having three or more (meth)acryloyloxy groups per molecule.

(Twenty-Second Invention)

A method for producing a hard coat film having a hard coat layer containing an ionizing radiation curable resin on a cycloolefin polymer base film via a primer layer, the method comprising:

applying a primer layer paint to the cycloolefin polymer base film, followed by drying to form a primer layer, wherein a surface of the primer layer has a static friction coefficient in the range of 0.6 to 2.0;

then applying a hard coat layer paint containing an ionizing radiation curable resin to the primer layer, followed by drying to form a hard coat layer; and then performing ionizing radiation irradiation.

(Twenty-Third Invention)

The hard coat film according to the first invention, wherein a surface of the primer layer has a ratio of static friction coefficient to dynamic friction coefficient (static friction coefficient/dynamic friction coefficient) of 2.5 or less.

(Twenty-Fourth Invention)

The hard coat film according to the twenty-third invention, wherein the primer layer has a surface free energy of 22 mN/m or more.

(Twenty-Fifth Invention)

The hard coat film according to the twenty-third or twenty-fourth invention, wherein the surface of the primer layer has a water contact angle of 110 degrees or less.

(Twenty-Sixth Invention)

The hard coat film according to any one of the twenty-third to twenty-fifth inventions, wherein the hard coat layer contains, as the ionizing radiation curable resin, a polyfunctional acrylate having three or more (meth)acryloyloxy groups per molecule.

(Twenty-Seventh Invention)

A method for producing a hard coat film having a hard coat layer containing an ionizing radiation curable resin on a cycloolefin polymer base film via a primer layer, the method comprising:

applying a primer layer paint to the cycloolefin polymer base film, followed by drying to form a primer layer, wherein a surface of the primer layer has a ratio of static friction coefficient to dynamic friction coefficient (static friction coefficient/dynamic friction coefficient) of 2.5 or less;

then applying a hard coat layer paint containing an ionizing radiation curable resin to the primer layer, followed by drying to form a hard coat layer; and then performing ionizing radiation irradiation.

Advantageous Effects of Invention

According to the present invention, a hard coat film having excellent adhesion, particularly excellent adhesion over time, to a hard coat layer can be obtained using a cycloolefin polymer film as a base material.

DESCRIPTION OF EMBODIMENTS

Embodiments for carrying out the present invention will be described in detail below; however, the present invention is not limited to the following embodiments.

In the present specification, the phrase "○○ to ΔΔ" means "○○ or more and ΔΔ or less," unless otherwise specified.

[Hard Coat Film]

As in the first invention described above, the hard coat film of the present invention comprises a hard coat layer containing an ionizing radiation curable resin laminated on at least one surface of a cycloolefin polymer base film via a primer layer.

Further, as in the second invention described above, the hard coat film of the present invention is the hard coat film according to the first invention, wherein the primer layer has an arithmetic average surface roughness (Ra) in the range of 0.5 nm to 15.0 nm, and a surface of the primer layer has a static friction coefficient in the range of 0.6 to 2.0.

Further, as in the eighth invention described above, the hard coat film of the present invention is the hard coat film according to the first invention, wherein the primer layer has an arithmetic average surface roughness (Ra) in the range of 0.5 nm to 15.0 nm.

Moreover, as in the thirteenth invention described above, the hard coat film of the present invention is the hard coat film according to the first invention, wherein the primer layer has a surface free energy of 22 mN/m or more.

Further, as in the eighteenth invention described above, the hard coat film of the present invention is the hard coat film according to the first invention, wherein a surface of the primer layer has a static friction coefficient in the range of 0.6 to 2.0.

Moreover, as in the twenty-third invention described above, the hard coat film of the present invention is the hard coat film according to the first invention, wherein a surface of the primer layer has a ratio of static friction coefficient to dynamic friction coefficient (static friction coefficient/dynamic friction coefficient) of 2.5 or less.

The configurations of these hard coat films will be described in detail below.

[Base Film]

First, the base film of the hard coat film will be described.

In the present invention, a cycloolefin polymer film having excellent transparency, heat resistance, dimensional stability, low hygroscopicity, low birefringence, optical isotropy, etc., is used as the base film of the hard coat film. Specifically, this film is one in which cycloolefin units are polymerized alternately or randomly in the polymer skeleton, and which has an alicyclic structure in the molecular structure. The subject thereof is a cycloolefin copolymer film, which is a copolymer containing at least one compound selected from norbornene compounds, monocyclic olefins, cyclic conjugated dienes, and vinyl alicyclic hydrocarbons, or a cycloolefin polymer film. Either of these films can be suitably selected and used.

Further, in the present invention, the thickness of the cycloolefin polymer film is suitably selected depending on the application, but is preferably in the range of 10 μm to 300 μm, and more preferably in the range of 20 μm to 200 μm, from the viewpoint of mechanical strength, handling properties, thinning of display devices, and the like.

Moreover, regarding the heat resistance of the cycloolefin polymer film, in the case of use for hard coat films, it is preferable to use a film having a glass transition temperature of about 120° C. to 170° C. measured by the thermogravimetry (TG) method or the differential scanning calorimetry (DSC) method, both of which measure heat changes when temperature changes are applied to samples.

In the present invention, when a hard coat layer is formed on one surface of the cycloolefin polymer film via a primer layer, the back surface of the cycloolefin polymer film, on which the hard coat layer is not formed, may be laminated with a polyethylene resin, a polypropylene resin, or a polyester resin, all of which have excellent releasability from the cycloolefin polymer film, as a protective layer by a co-extrusion method during formation of the cycloolefin polymer film, for the purpose of preventing crimping during winding of the cycloolefin polymer film, and improving the running properties of the film during formation of the hard coat layer. It is also possible to use a film to which a protective film, such as a polyethylene resin, a polypropylene resin, or a polyester resin, having a weak adhesive layer formed on the back surface thereof, is attached.

Examples of the cycloolefin polymer film include commercially available Zeonor (trade name: produced by Zeon Corporation), Optica (trade name: produced by Mitsui Chemicals, Inc.), Arton (trade name: produced by JSR Corporation), Coxec (trade name: produced by Kurabo Industries Ltd.), and the like.

[Primer Layer]

Next, the primer layer of the hard coat film will be described.

In the hard coat film of the present invention, the primer layer preferably has an arithmetic average surface roughness (Ra) in the range of 0.5 nm to 15.0 nm, and a surface of the primer layer preferably has a static friction coefficient in the range of 0.6 to 2.0.

The hard coat film of the present invention uses a primer layer between the base film and the hard coat layer. Since the primer layer preferably has surface characteristics, that is, the surface thereof has an arithmetic average surface roughness (Ra) in the range of 0.5 nm to 15.0 nm and a static friction coefficient in the range of 0.6 to 2.0, the adhesion to the hard coat layer can be improved when a cycloolefin polymer film is used as the base material, and particularly the adhesion over time can be significantly improved.

The surface of the primer layer mentioned above refers to a surface on the side in contact with the hard coat layer laminated on the primer layer.

The arithmetic average surface roughness (Ra) mentioned above is a value that is defined by JIS B 0031 (1994)/JIS B 0061 (1994) Annex, and that is obtained by averaging absolute deviation from the average line of the roughness curve at a certain reference length: that is, it refers to the average value of unevenness when the roughness curve portion below the average line is folded back to the positive value side. The specific evaluation method (measurement method) of the arithmetic average surface roughness (Ra) will be described later.

In the present invention, in order to improve the adhesion (particularly adhesion over time) to the hard coat layer, the arithmetic average surface roughness (Ra) of the surface of the primer layer is preferably in the range of 0.5 nm to 15.0 nm. If the arithmetic average surface roughness (Ra) is less than 0.5 nm, there are problems in that the adhesion to the hard coat layer is deteriorated, and that the processing suitability (coater transportability during coating of the hard coat layer) is lowered. Further, if the arithmetic average surface roughness (Ra) is larger than 15.0 nm (exceeds 15.0 nm), the appearance may be poor after coating of the hard coat layer. In the present invention, the arithmetic average surface roughness (Ra) of the primer layer is more preferably in the range of 1.0 nm to 13.0 nm.

The arithmetic average surface roughness (Ra) of the primer layer can be adjusted, for example, by adding fine particles to the primer layer, or by changing the type of resin used in the primer layer, the type of solvent of the primer layer paint, or the drying conditions during coating of the primer layer.

Further, the static friction coefficient mentioned above is the ratio of the magnitude of the maximum frictional force acting on the contact surface and the drag force perpendicular to the contact surface when two objects are stationary while they are in contact with each other.

In the present invention, the static friction coefficient of the surface of the primer layer is a value measured by an automatic friction and wear analyzer TSf-502 produced by Kyowa Interface Science Co., Ltd., at a load of 200 gf/cm$^2$ against a metal plate (hard chrome-plated surface, surface finish: 3.2 s).

In the present invention, in order to improve the adhesion (particularly adhesion over time) to the hard coat layer, the static friction coefficient of the surface of the primer layer is preferably in the range of 0.6 to 2.0. If the static friction coefficient is larger than 2.0 (exceeds 2.0), the processing suitability (coater transportability during coating of the hard coat layer) may be problematic. Further, even if the static friction coefficient is too small, the processing suitability is also problematic; therefore, the lower limit of the static friction coefficient is preferably 0.6 or more. In the present invention, the static friction coefficient of the primer layer is particularly preferably in the range of 0.6 to 1.7.

The static friction coefficient of the surface of the primer layer can be adjusted, for example, by adding fine particles to the primer layer, or by changing the type of resin used in the primer layer, the type of solvent of the primer layer paint, or the drying conditions during coating of the primer layer.

In the hard coat film of the present invention, the reason why the adhesion (particularly adhesion over time) to the hard coat film can be improved when the arithmetic average surface roughness (Ra) or static friction coefficient of the surface of the primer layer falls within the range of the present invention is presumed as follows.

The arithmetic average surface roughness (Ra) shows microscopic surface unevenness in a part of the roughness curve, and does not necessarily completely show the surface unevenness as a whole, but is an indicator microscopically showing surface unevenness. On the other hand, the static friction coefficient is known to be a small value when the surface unevenness is large so that the contact surface is point contact, and is an indicator macroscopically showing surface unevenness.

The surface unevenness of the primer layer increases the contact interface with the hard coat layer (increase in the surface area of the primer layer). Further, the hard coat layer enters and solidifies in the surface unevenness of the primer layer, and acts like a wedge (anchoring force); it is particularly effective in improving adhesion over time. However, the excessive surface unevenness of the primer layer causes a poor appearance after coating of the hard coat layer.

Thus, the arithmetic average surface roughness (Ra) and static friction coefficient of the surface of the primer layer are both also indicators of the surface unevenness of the primer layer, and are involved in the adhesion to the hard coat layer. Therefore, when the arithmetic average surface roughness (Ra) or static friction coefficient of the primer layer surface falls within the range of the present invention, the surface unevenness of the top layer of the primer layer can be adjusted within the range in which the adhesion to the hard coat layer is optimal. Moreover, it is more preferable that the arithmetic average surface roughness (Ra) and static friction coefficient of the primer layer surface are both within the ranges of the present invention.

Moreover, in the present invention, the ratio of static friction coefficient to dynamic friction coefficient (static friction coefficient/dynamic friction coefficient) of the surface of the primer layer is further preferably 2.5 or less.

Here, the dynamic friction coefficient mentioned above is the ratio of the magnitude of the frictional force acting on the contact surface and the drag force perpendicular to the contact surface when two objects are moving while they are in contact with each other. In the present invention, the dynamic friction coefficient of the surface of the primer layer is a value measured using an automatic friction and wear analyzer TSf-502 produced by Kyowa Interface Science Co., Ltd., at a load of 200 gf/cm$^2$ against a metal plate (hard chrome-plated surface, surface finish: 3.2 s). In addition, the static friction coefficient is as described above.

The ratio of static friction coefficient to dynamic friction coefficient (static friction coefficient/dynamic friction coefficient) of the surface of the primer layer is like an indicator of the force required to cut adhesion due to the intermolecular force of the area of the real contact point (real contact area). In the present invention, since this ratio is 2.5 or less, the difference between the static friction coefficient and the dynamic friction coefficient is small; therefore, suitable adhesion can be exhibited, particularly for dynamic adhesion (against continuous peeling occurring at the peeling interface) to the hard coat layer laminated on the primer layer. If this ratio is larger than 2.5 (exceeds 2.5), the difference between the static friction coefficient and the dynamic friction coefficient increases to cause inferior adhesion, and the processing suitability (coater transportability during coating of the hard coat layer) may be problematic.

In the present invention, the ratio of static friction coefficient to dynamic friction coefficient (static friction coefficient/dynamic friction coefficient) of the surface of the primer layer is particularly preferably in the range of 1.0 to 2.0.

Not only the static friction coefficient, but also the dynamic friction coefficient, of the primer layer surface can be adjusted, for example, by adding fine particles to the primer layer, or by changing the type of primer layer resin, the type of solvent of the primer layer paint, or the drying conditions during coating of the primer layer. This also makes it possible to adjust the ratio of static friction coefficient to dynamic friction coefficient (static friction coefficient/dynamic friction coefficient) of the primer layer surface.

Moreover, in the present invention, the surface free energy of the primer layer surface is further preferably 22 mN/m or more.

The surface free energy mentioned herein is defined as the "free energy of the unit area of the surface," and refers to the excess energy of the primer layer surface compared with the inside (bulk) of the layer. The larger the surface free energy of a solid, the more easily gas and fine particles are adsorbed, the more easily a liquid gets wet, and the more easily it adheres to other solids.

The surface free energy can be measured by analyzing the contact angles of water and hexadecane by the Kaelble-Uy method using a contact angle meter or the like. In the present invention, the surface free energy of the primer layer is specifically a value calculated from the contact angle of water and the contact angle of n-hexadecane by the Kaelble-Uy method using a fully automatic contact angle meter DM-701 produced by Kyowa Interface Science Co., Ltd., where the contact angle of water is obtained by dropping 1 μL of water (pure water) on the primer layer surface and measuring the contact angle after 30 seconds; and the contact angle of n-hexadecane is obtained by dropping 1 μL of n-hexadecane on the primer layer surface and measuring the contact angle after 30 seconds.

The value of the surface free energy of the primer layer is an indicator of the adhesiveness to the resin of the hard coat layer. In the present invention, since the surface free energy is 22 mN/m or more, the intermolecular force between the molecules of the hard coat layer resin and the molecules of the primer layer increases, thereby contributing to the improvement of the adhesion to the hard coat layer. If the surface free energy is less than 22 mN/m, the adhesion to the hard coat layer may be problematically deteriorated, or cissing defects may occur during coating of the hard coat layer.

In the present invention, the surface free energy of the primer layer is particularly preferably 25 mN/m or more.

Even if the surface free energy of the primer layer is too large, dirt may be easily attached to cause contamination by foreign matter, and the scratch resistance may be deteriorated. Therefore, the upper limit of the surface free energy is preferably 40 mN/m or less, more preferably 38 mN/m or less, and even more preferably 35 mN/m or less.

The surface free energy of the primer layer can be adjusted, for example, depending on the type of resin used in the primer layer, or by adding a leveling agent (type and amount of leveling agent, etc.) to the primer layer.

Moreover, in the present invention, the contact angle of water of the primer layer surface is further preferably 110 degrees or less.

In the present invention, the contact angle of water of the primer layer surface is a value measured by the method described below. That is, using a fully automatic contact angle meter DM-701 produced by Kyowa Interface Science Co., Ltd., 1 μL of water (pure water) was dropped on the primer layer surface, and the contact angle after 30 seconds was measured.

The value of the contact angle of water of the primer layer surface is an indicator showing the adhesiveness to the resin used in the hard coat layer. In the present invention, since the contact angle of water of the primer layer surface is 110 degrees or less, the intermolecular force between the molecules of the hard coat layer resin and the molecules of the primer layer increases, consequently contributing to the improvement of the adhesion to the hard coat layer. On the other hand, if the contact angle is larger than 110 degrees, the adhesion to the hard coat layer may be problematically deteriorated, and cissing defects may occur during coating of the hard coat layer.

In the present invention, the contact angle of water of the primer layer surface is particularly preferably 105 degrees or less.

If the water contact angle is too low, the primer layer tends to have inferior scratch resistance; thus, the water contact angle is desirably 50 degrees or more.

The contact angle of water of the primer layer surface can be adjusted, for example, by adding a leveling agent to the primer layer (type and amount of leveling agent, etc.), or by changing the type of resin used in the primer layer.

In the present invention, as the resin used in the primer layer, any resin can be used without particular limitation, as long as it forms a film.

For example, from the viewpoint of the adhesion to the base film (cycloolefin polymer film), acrylic resins, such as polyolefin resin, styrene acrylic resin, and methyl methacrylate resin; epoxy resins, isocyanate resins, fibrin resins, or a mixture of two or more of these resins can be preferably used.

The primer layer may contain inorganic or organic fine particles, from the viewpoint of preventing blocking between film surfaces. Further, since the primer layer contains such inorganic or organic fine particles, the surface characteristics (arithmetic average surface roughness (Ra), static friction coefficient, dynamic friction coefficient, etc.) of the primer layer can be adjusted.

Examples of inorganic fine particles include fine particles of alumina, zinc oxide, silica, titanium oxide, cerium oxide, or the like. Examples of organic fine particles include fine particles of acrylic, melamine-formaldehyde condensate, polyethylene, styrene acrylic, polyester, or the like. It is preferable to use fine particles having a particle diameter of 0.05 μm to 0.20 μm, for example.

Moreover, the primer layer can be mixed with a leveling agent for the purpose of adjusting the surface characteristics (surface free energy, water contact angle, etc.) and improving the coating properties. Usable examples thereof include known leveling agents, such as fluorine leveling agents, acrylic leveling agents, siloxane leveling agents, and adducts or mixtures thereof. The mixing amount is suitably determined depending on, for example, the adjustment of the surface characteristics and the coating properties.

In addition, as other additives to be added to the primer layer, ultraviolet absorbers, defoamers, antifouling agents, antioxidants, antistatic agents, light stabilizers, and the like may be mixed, as needed, as long as the effects of the present invention are not impaired.

The coating thickness of the primer layer in the present invention is not particularly limited, but is preferably in the range of 0.1 μm to 5.0 μm, which does not adversely affect the adhesion between the base film and the hard coat layer, or the pencil hardness of the hard coat layer. The coating thickness of the primer layer can be measured by actual measurement with a micrometer.

In the present invention, the primer layer is formed by applying a paint (primer layer paint), which is obtained by dissolving and dispersing the resin forming the primer layer, and optionally inorganic or organic fine particles, a leveling agent, other additives, etc., in a suitable organic solvent, to the cycloolefin polymer film (base film), followed by drying. In this case, the organic solvent can be suitably selected depending on the solubility of the resin contained therein. From the viewpoint of the solvent being capable of uniformly dissolving or dispersing at least the solids (resin and other additives), workability during coating, and drying properties, it is preferable to use, for example, an organic solvent having a boiling point of 50° C. to 160° C. Examples of such organic solvents include aromatic solvents, such as toluene, xylene, and n-heptane; aliphatic solvents, such as cyclohexane, methylcyclohexane, and ethylcyclohexane; ester solvents, such as methyl acetate, ethyl acetate, propyl acetate, isopropyl acetate, butyl acetate, and methyl lactate; ketone solvents, such as acetone, methyl ethyl ketone, methyl isobutyl ketone, and cyclohexanone; alcohol solvents, such as methanol, ethanol, isopropyl alcohol, n-propyl alcohol, and butanol; and other known organic solvents. These solvents can be used singly or in combination of two or more.

In the present invention, as the method for applying the primer layer paint to the base film, the primer layer can be applied by a known coating method, such as gravure coating, micro-gravure coating, fountain bar coating, slide die coating, slot die coating, a screen printing method, or a spray coating method. The paint applied to the cycloolefin polymer film is dried generally at a temperature of about 50 to 120° C., while suitably adjusting the drying conditions (temperature in the drying furnace, wind speed in the furnace, drying time, etc.), to remove the solvent, thereby forming a coating film.

[Hard Coat Layer]

Next, the hard coat layer of the hard coat film will be described.

In the present invention, as the resin contained in the hard coat layer, any resin can be used without limitation, as long as it forms a film. In particular, it is preferable to use an ionizing radiation curable resin, because surface hardness (pencil hardness and scratch resistance) can be imparted to the hard coat layer, the degree of crosslinking can be adjusted by the amount of UV exposure, and the surface hardness of the hard coat layer can be adjusted.

The ionizing radiation curable resin used in the present invention is not particularly limited, as long as it is a transparent resin that is cured by irradiation with ultraviolet rays (hereinafter abbreviated as "UV") or electron beams (hereinafter abbreviated as "EB"); however, in terms of the coating film hardness and the hard coat layer forming a three-dimensional crosslinked structure, resins comprising a UV- or EB-curable polyfunctional acrylate having three or more (meth)acryloyloxy groups per molecule are preferable. Specific examples of the UV- or EB-curable polyfunctional acrylate having three or more (meth)acryloyloxy groups per molecule include trimethylolpropane tri(meth)acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, trimethylolpropane ethoxy triacrylate, glycerin propoxy triacrylate, ditrimethylolpropane tetraacrylate, and the like. The polyfunctional acrylates may be used not only singly but also as a mixture of two or more.

Further, the ionizing radiation curable resin used in the present invention is preferably a polymer having a weight average molecular weight in the range of 700 to 3600, more preferably a weight average molecular weight in the range of 700 to 3000, and even more preferably a weight average molecular weight of 700 to 2400. If the weight average molecular weight is less than 700, the curing shrinkage is large during curing by UV or EB irradiation, a phenomenon in which the hard coat film warps to the hard coat layer surface side (curling) increases, defects occur in the subsequent processing steps, and processing suitability is poor. Moreover, it is not suitable that the weight average molecular weight exceeds 3600, because the flexibility of the hard coat layer increases, but the hardness is insufficient.

Moreover, when the weight average molecular weight of the ionizing radiation curable resin used in the present invention is less than 1500, the number of functional groups per molecule is preferably 3 or more and less than 10. In contrast, when the weight average molecular weight of the ionizing radiation curable resin is 1500 or more, the number of functional groups per molecule is preferably 3 or more and 20 or less. Within the above ranges, curling can be suppressed while suppressing the occurrence of cracks under heat-resistant conditions (stored at 100° C. for 5 minutes), and suitable processing suitability can be maintained.

Further, as the resin contained in the hard coat layer, in addition to the ionizing radiation curable resins described above, thermoplastic resins, such as polyethylene, polypropylene, polystyrene, polycarbonate, polyester, acrylic, styrene-acrylic, and fibrin, and thermosetting resins, such as phenol resin, urea resin, unsaturated polyester, epoxy, and silicon resin, may be mixed within the range that does not impair the hardness and scratch resistance of the hard coat layer.

Moreover, it is possible to further improve the surface hardness (scratch resistance) by incorporating inorganic oxide fine particles into the hard coat layer. In this case, the average particle diameter of the inorganic oxide fine particles is preferably in the range of 5 to 50 nm, and more preferably in the range of 10 to 20 nm. If the average particle diameter is less than 5 nm, it is difficult to obtain sufficient surface hardness. In contrast, if the average particle diameter exceeds 50 nm, the gloss and transparency of the hard coat layer are likely to be lowered, and the flexibility may also be lowered.

In the present invention, examples of the inorganic oxide fine particles include alumina, silica, and the like. Among these, alumina containing aluminum as a main component is particularly preferable because it has a high hardness, and is thus effective even with a smaller addition amount than silica.

In the present invention, the content of the inorganic oxide fine particles is preferably 0.1 to 10.0 parts by weight based on 100 parts by weight of the ionizing radiation curable resin in the hard coat layer. If the content of the inorganic oxide fine particles is less than 0.1 parts by weight, it is difficult to obtain an effect of improving the surface hardness (scratch resistance). In contrast, if the content exceeds 10.0 parts by weight, the haze increases, which is not preferable.

The hard coat paint for forming the hard coat layer may contain a photopolymerization initiator. Usable examples of such photopolymerization initiators include commercially available acetophenones, such as IRGACURE 651 and IRGACURE 184 (trade names: produced by BASF); and benzophenones, such as IRGACURE 500 (trade name: produced by BASF).

A leveling agent can be used in the hard coat layer for the purpose of improving the coating properties. Usable examples thereof include known leveling agents, such as fluorine leveling agents, acrylic leveling agents, siloxane leveling agents, and adducts or mixtures thereof. The mixing amount can be set in the range of 0.03 parts by weight to 3.0 parts by weight based on 100 parts by weight of the solid content of the resin in the hard coat layer. Moreover, in touch panel applications etc., when adhesiveness using an optical transparent adhesive OCR is required for the purpose of adhesion to cover glass (CG), transparent conductive members (TSP), liquid crystal modules (LCM), etc., of touch panel terminals, it is preferable to use an acrylic leveling agent or fluorine leveling agent having a high surface free energy (approximately 40 mN/m or more).

As other additives to be added to the hard coat layer, ultraviolet absorbers, defoamers, surface tension-adjusting agents, antifouling agents, antioxidants, antistatic agents, light stabilizers, and the like may be mixed, as needed, as long as the effects of the present invention are not impaired.

Regarding the hard coat layer, a hard coat paint, which is obtained by dissolving and dispersing the ionizing radiation curable resin described above as well as a photopolymerization initiator, other additives, etc., in a suitable solvent, is applied to the primer layer and then dried, followed by irradiation with ionizing radiation, such as UV or EB, to induce photopolymerization, whereby a hard coat layer having excellent hardness can be obtained. The solvent can be suitably selected according to the solubility of the resin to be mixed, and may be any solvent that can uniformly dissolve or disperse at least the solids (resin, photopolymerization initiator, other additives, etc.). Examples of such solvents include aromatic solvents, such as toluene, xylene, and n-heptane; aliphatic solvents, such as cyclohexane, methylcyclohexane, and ethylcyclohexane; ester solvents, such as methyl acetate, ethyl acetate, propyl acetate, isopropyl acetate, butyl acetate, and methyl lactate; ketone solvents, such as acetone, methyl ethyl ketone, methyl isobutyl ketone, and cyclohexanone; alcohol solvents, such as methanol, ethanol, isopropyl alcohol, and n-propyl alcohol; and other known organic solvents. These solvents can be used singly or in combination of two or more.

The method for applying the hard coat paint that forms the hard coat layer is not particularly limited; however, the hard coat paint is applied by a known coating method, such as gravure coating, micro-gravure coating, fountain bar coating, slide die coating, slot die coating, a screen printing method, or a spray coating method, and then dried generally at a temperature of about 50 to 120° C.

The coating thickness of the hard coat layer is not particularly limited, but is preferably in the range of, for example, 1.0 μm to 5.0 μm, and more preferably in the range of 1.5 μm to 3.5 μm. It is not preferable that the coating thickness is less than 1.0 μm, because the required scratch resistance is reduced, and the pencil hardness is reduced. It is also not preferable that the coating thickness exceeds 5.0 μm, because strong curling is likely to occur, and the handling properties are lowered in the production process etc. The coating film thickness of the hard coat layer can be measured by actual measurement with a micrometer.

[Method for Producing Hard Coat Film]

The present invention also provides a method for producing a hard coat film having the configuration described above.

That is, the present invention is a method for producing a hard coat film having a hard coat layer containing an ionizing radiation curable resin on a cycloolefin polymer base film via a primer layer, the method comprising:

applying a primer layer paint to the cycloolefin polymer base film, followed by drying to form a primer layer, wherein the primer layer has an arithmetic average surface roughness (Ra) in the range of 0.5 nm to 15.0 nm, and a surface of the primer layer has a static friction coefficient in the range of 0.6 to 2.0;

then applying a hard coat layer paint containing an ionizing radiation curable resin to the primer layer, followed by drying to form a hard coat layer; and then performing ionizing radiation irradiation (the seventh invention described above).

Further, the surface of the primer layer, which is obtained by applying the primer layer paint to the base film, followed by drying, preferably has a ratio of static friction coefficient to dynamic friction coefficient (static friction coefficient/dynamic friction coefficient) of 2.5 or less.

Moreover, the surface free energy of the primer layer surface is more preferably 22 mN/m or more. Furthermore, the contact angle of water of the primer layer surface is more preferably 110 degrees or less.

Further, the present invention is a method for producing a hard coat film having a hard coat layer containing an ionizing radiation curable resin on a cycloolefin polymer base film via a primer layer, the method comprising:

applying a primer layer paint to the cycloolefin polymer base film, followed by drying to form a primer layer, wherein the primer layer has an arithmetic average surface roughness (Ra) in the range of 0.5 nm to 15.0 nm;

then applying a hard coat layer paint containing an ionizing radiation curable resin to the primer layer, followed by drying to form a hard coat layer; and then performing ionizing radiation irradiation (the twelfth invention described above).

Further, the present invention is a method for producing a hard coat film having a hard coat layer containing an ionizing radiation curable resin on a cycloolefin polymer base film via a primer layer, the method comprising:

applying a primer layer paint to the cycloolefin polymer base film, followed by drying to form a primer layer, wherein the primer layer has a surface free energy of 22 mN/m or more;

then applying a hard coat layer paint containing an ionizing radiation curable resin to the primer layer, followed by drying to form a hard coat layer; and then performing ionizing radiation irradiation (the seventeenth invention described above).

Further, the present invention is a method for producing a hard coat film having a hard coat layer containing an ionizing radiation curable resin on a cycloolefin polymer base film via a primer layer, the method comprising:

applying a primer layer paint to the cycloolefin polymer base film, followed by drying to form a primer layer, wherein a surface of the primer layer has a static friction coefficient in the range of 0.6 to 2.0;

then applying a hard coat layer paint containing an ionizing radiation curable resin to the primer layer, followed by drying to form a hard coat layer; and then performing ionizing radiation irradiation (the twenty-second invention described above).

Further, the present invention is a method for producing a hard coat film having a hard coat layer containing an ionizing radiation curable resin on a cycloolefin polymer base film via a primer layer, the method comprising:

applying a primer layer paint to the cycloolefin polymer base film, followed by drying to form a primer layer, wherein a surface of the primer layer has a ratio of static friction coefficient to dynamic friction coefficient (static friction coefficient/dynamic friction coefficient) of 2.5 or less;

then applying a hard coat layer paint containing an ionizing radiation curable resin to the primer layer, followed by drying to form a hard coat layer; and then performing ionizing radiation irradiation (the twenty-seventh invention described above).

The preparation of the primer layer paint and the hard coat layer paint, the coating methods of these paints, the drying methods of the resulting coating films, etc., are as described above. Moreover, the exposure dose of ionizing radiation (UV, EB, etc.) after the formation of the hard coat layer may be an exposure dose required to impart sufficient hardness to the hard coat layer, and can be suitably set depending on, for example, the type of ionizing radiation curable resin.

As described above in detail, according to the hard coat film of the present invention, in which a hard coat layer containing an ionizing radiation curable resin is laminated on at least the one surface of a cycloolefin polymer base film via a primer layer, it is possible to obtain a hard coat film having excellent adhesion to a hard coat layer when using a cycloolefin polymer film as a base material.

Moreover, since the primer layer has an arithmetic average surface roughness (Ra) in the range of 0.5 nm to 15.0 nm, and the surface of the primer layer has a static friction coefficient in the range of 0.6 to 2.0, it is possible to obtain a hard coat film having excellent adhesion, particularly adhesion over time, to a hard coat layer when using a cycloolefin polymer film as a base material.

Moreover, since the primer layer has an arithmetic average surface roughness (Ra) in the range of 0.5 nm to 15.0 nm, it is possible to obtain a hard coat film having excellent adhesion, particularly adhesion over time, to a hard coat layer when using a cycloolefin polymer film as a base material.

Moreover, since the primer layer has a surface free energy of 22 mN/m or more, it is possible to obtain a hard coat film having excellent adhesion, particularly adhesion over time, to a hard coat layer when using a cycloolefin polymer film as a base material.

Moreover, since the surface of the primer layer has a static friction coefficient in the range of 0.6 to 2.0, it is possible to obtain a hard coat film having excellent adhesion, particularly adhesion over time, to a hard coat layer when using a cycloolefin polymer film as a base material.

Moreover, since the surface of the primer layer has a ratio of static friction coefficient to dynamic friction coefficient (static friction coefficient/dynamic friction coefficient) of 2.5 or less, it is possible to obtain a hard coat film having excellent adhesion, particularly adhesion over time, to a hard coat layer when using a cycloolefin polymer film as a base material.

EXAMPLES

Next, embodiments of the present invention will be described in more detail with reference to Examples; however, the present invention is not limited to the following Examples.

Unless otherwise specified, "parts" and "%" described below represent "parts by weight" and "wt. %," respectively.

The following Examples 1 to 18 are examples corresponding to the first and second inventions described above.

Example 1

<Preparation of Primer Layer Paint>

A polyolefin resin (modified polyolefin) "UNISTOLE P-802 (trade name)" (solid content: 22%, produced by Mitsui Chemicals, Inc.) was diluted with butyl acetate/toluene=85/15 (wt. %) until the solid content concentration (paint concentration) was 7.0% to prepare a primer layer paint.

<Preparation of Hard Coat Layer Paint>

Using 100 parts of a urethane acrylate ultraviolet-curing resin "ARTRESIN UN-908 (trade name)" (solid content: 100%, number of (meth)acryloyloxy groups: 9, weight average molecular weight: 3600, produced by Negami Chemical Industrial Co., Ltd.) as a main agent, 3.5 parts of IRGACURE 184 (a photopolymerization initiator, produced by BASF), 2.5 parts of TINUVIN 292 (a hindered amine light stabilizer, produced by BASF), and 0.3 parts of a leveling agent Megaface RS75 (a fluorine leveling agent, produced by DIC Corporation) were diluted with butyl acetate/n-propyl alcohol=50/50 (parts by weight) until the solid content concentration of the ultraviolet-curing resin in the paint was 35%, followed by sufficient stirring to prepare a hard coat layer paint.

<Production of Primer Layer Coating Film>

The above primer layer paint was applied to one surface of Zeonor Film ZF14 (produced by Zeon Corporation) having a thickness of 40 μm as a cycloolefin film using a bar coater (#4), followed by hot-air drying in a drying furnace at 100° C. at a wind speed of 1 m/sec in the furnace for 60 seconds for drying and solidification to form a primer layer with a coating film thickness of 0.4 μm, thereby obtaining a primer layer coating film.

The surface characteristics of the primer layer of the primer layer coating film obtained in this manner were measured for the following items. The results were summarized in Table 1 together with other Examples and Comparative Examples.

(1) Arithmetic Average Surface Roughness (Ra)

The measurement was performed using a three-dimensional surface roughness meter "VertScan2.0" produced by Ryoka System Co., Ltd.

[Optical Conditions]
Camera: SONY HR-50 1/3 type
Objective: 10× (10 times)
Tube: 1×Body
Relay: No Relay
Filter: 530 white
*Light intensity adjustment: Automatically performed so that the Lamp value falls within the range of 50 to 95.
[Measurement Conditions]
Mode: Phaze
Size: 640×480
Range (μm): Start (10), Stop (−10)

(2) Static Friction Coefficient, Dynamic Friction Coefficient, and Ratio (Static Friction Coefficient/Dynamic Friction Coefficient)

Using an automatic friction and wear analyzer TSf-502 produced by Kyowa Interface Science Co., Ltd., the static friction coefficient and dynamic friction coefficient were measured at a load of 200 gf/cm$^2$ against a metal plate (hard chrome-plated surface, surface finish: 3.2 s). Moreover, the ratio of static friction coefficient to dynamic friction coefficient (static friction coefficient/dynamic friction coefficient) was calculated from the results.

(3) Contact Angle of Water

Using a fully automatic contact angle meter DM-701 produced by Kyowa Interface Science Co., Ltd, 1 μL of water (purified water) was dropped on the surface of the primer layer, and the contact angle after 30 seconds was measured.

(4) Surface Free Energy

Using a fully automatic contact angle meter DM-701 produced by Kyowa Interface Science Co., Ltd., 1 μL of water (purified water) is dropped on the surface of the primer layer, and the contact angle after 30 seconds is measured. Further, 1 μL of n-hexadecane is dropped on the surface of the primer layer, and the contact angle after 30 seconds is measured. Using the contact angle of water and the contact angle of n-hexadecane measured as described above, the surface free energy was calculated by the Kaelble-Uy method.

<Production of Hard Coat Film>

Next, the above hard coat layer paint was applied to the primer layer of a primer layer coating film, which was produced in entirely the same manner as described above, using a bar coater, followed by hot-air drying in a drying furnace at 80° C. for 1 minute to form a coating layer with a coating film thickness of 2.5 μm. This layer was cured using a UV irradiation device set at a height of 60 mm from the coating surface at a UV dose of 180 mJ/cm$^2$ to form a hard coat layer, thereby producing a hard coat film of the present Example.

Example 2

A primer layer coating film and a hard coat film (Example 2) were produced in the same manner as in Example 1, except that the resin mixed with the primer layer paint of Example 1 was changed to a polyolefin resin (modified polyolefin) "UNISTOLE P-901 (trade name)" (solid content: 22%, produced by Mitsui Chemicals, Inc.), and a primer layer paint having a solid content concentration of 7.0% was used. Moreover, the surface characteristics of the primer layer of the primer layer coating film were measured in the same manner as in Example 1.

Example 3

A primer layer coating film and a hard coat film (Example 3) were produced in the same manner as in Example 1, except that the resin mixed with the primer layer paint of Example 1 was changed to a polyolefin resin (modified polyolefin) "UNISTOLE P-902 (trade name)" (solid content: 22%, produced by Mitsui Chemicals, Inc.), and a primer layer paint having a solid content concentration of 7.0% was used. Moreover, the surface characteristics of the primer layer of the primer layer coating film were measured in the same manner as in Example 1.

Example 4

A primer layer coating film and a hard coat film (Example 4) were produced in the same manner as in Example 3, except that the drying conditions after coating the primer layer paint of Example 3 were changed to hot-air drying in a drying furnace at 60° C. at a wind speed of 1 m/sec in the furnace for 60 seconds. Moreover, the surface characteristics of the primer layer of the primer layer coating film were measured in the same manner as in Example 1.

Example 5

A primer layer coating film and a hard coat film (Example 5) were produced in the same manner as in Example 1, except that a primer layer paint mixed with the same polyolefin resin (modified polyolefin) "UNISTOLE P-802 (trade name)" (solid content: 22%, produced by Mitsui Chemicals, Inc.) as that of Example 1 and having a solid content concentration of 5.5% was used, and a primer layer with a coating film thickness of 0.3 μm was formed. Moreover, the surface characteristics of the primer layer of the primer layer coating film were measured in the same manner as in Example 1.

Example 6

A primer layer coating film and a hard coat film (Example 6) were produced in the same manner as in Example 5, except for using a primer layer paint obtained by further mixing 0.5% of a leveling agent Ftergent 602A (a fluorine leveling agent, produced by Neos Co., Ltd.) with the primer layer paint of Example 5. Moreover, the surface characteristics of the primer layer of the primer layer coating film were measured in the same manner as in Example 1.

Example 7

A primer layer coating film and a hard coat film (Example 7) were produced in the same manner as in Example 5, except for using a primer layer paint obtained by further mixing 0.5% of a leveling agent Megaface RS-75 (a fluorine leveling agent, produced by DIC Corporation) with the primer layer paint of Example 5. Moreover, the surface characteristics of the primer layer of the primer layer coating film were measured in the same manner as in Example 1.

Example 8

A primer layer coating film and a hard coat film (Example 8) were produced in the same manner as in Example 1, except that the resin mixed with the primer layer paint of Example 1 was changed to a polyolefin resin (modified polyolefin) "UNISTOLE P-901 (trade name)" (solid content: 22%, produced by Mitsui Chemicals, Inc.), a primer layer paint having a solid content concentration of 5.5% was used, and a primer layer with a coating film thickness of 0.3 μm was formed. Moreover, the surface characteristics of the primer layer of the primer layer coating film were measured in the same manner as in Example 1.

Example 9

A primer layer coating film and a hard coat film (Example 9) were produced in the same manner as in Example 8, except for using a primer layer paint obtained by further mixing 0.5% of a leveling agent Ftergent 602A (a fluorine leveling agent, produced by Neos Co., Ltd.) with the primer layer paint of Example 8. Moreover, the surface characteristics of the primer layer of the primer layer coating film were measured in the same manner as in Example 1.

Example 10

A primer layer coating film and a hard coat film (Example 10) were produced in the same manner as in Example 8, except for using a primer layer paint obtained by further mixing 0.5% of a leveling agent Megaface RS-75 (a fluorine leveling agent, produced by DIC Corporation) with the primer layer paint of Example 8. Moreover, the surface characteristics of the primer layer of the primer layer coating film were measured in the same manner as in Example 1.

Example 11

A primer layer coating film and a hard coat film (Example 11) were produced in the same manner as in Example 1, except that the resin mixed with the primer layer paint of Example 1 was changed to a polyolefin resin (modified polyolefin) "UNISTOLE P-902 (trade name)" (solid content: 22%, produced by Mitsui Chemicals, Inc.), a primer layer paint having a solid content concentration of 5.5% was used, and a primer layer with a coating film thickness of 0.3 μm was formed. Moreover, the surface characteristics of the primer layer of the primer layer coating film were measured in the same manner as in Example 1.

Example 12

A primer layer coating film and a hard coat film (Example 12) were produced in the same manner as in Example 11, except for using a primer layer paint obtained by further mixing 0.5% of a leveling agent Ftergent 602A (a fluorine leveling agent, produced by Neos Co., Ltd.) with the primer layer paint of Example 11. Moreover, the surface characteristics of the primer layer of the primer layer coating film were measured in the same manner as in Example 1.

Example 13

A primer layer coating film and a hard coat film (Example 13) were produced in the same manner as in Example 11, except for using a primer layer paint obtained by further mixing 0.5% of a leveling agent Megaface RS-75 (a fluorine leveling agent, produced by DIC Corporation) with the primer layer paint of Example 11. Moreover, the surface characteristics of the primer layer of the primer layer coating film were measured in the same manner as in Example 1.

Example 14

A primer layer coating film and a hard coat film (Example 14) were produced by forming a primer layer with a coating thickness of 0.2 μm by primer layer coating in the same manner as in Example 1, except that the resin mixed with the primer layer paint of Example 1 was changed to a polyolefin resin (modified polyolefin) "AUROREN S-5419T (trade name)" (solid content: 15%, produced by Nippon Paper Industries Co., Ltd.), and a primer layer paint having a solid content concentration of 3.0% was used. Moreover, the surface characteristics of the primer layer of the primer layer coating film were measured in the same manner as in Example 1.

Example 15

A primer layer coating film and a hard coat film (Example 15) were produced in the same manner as in Example 14, except that the primer layer paint of Example 14 was applied using a bar coater (#6) to form a primer layer with a coating film thickness of 0.3 μm. Moreover, the surface characteristics of the primer layer of the primer layer coating film were measured in the same manner as in Example 1.

Example 16

A primer layer coating film and a hard coat film (Example 16) were produced in the same manner as in Example 7, except that the primer layer paint of Example 7 was applied using a bar coater (#6) to form a primer layer with a coating film thickness of 0.6 μm. Moreover, the surface characteristics of the primer layer of the primer layer coating film were measured in the same manner as in Example 1.

Example 17

A primer layer coating film and a hard coat film (Example 17) were produced in the same manner as in Example 7, except that the primer layer paint of Example 7 was applied using a bar coater (#10) to form a primer layer with a coating film thickness of 1.0 μm. Moreover, the surface characteristics of the primer layer of the primer layer coating film were measured in the same manner as in Example 1.

Example 18

A primer layer coating film and a hard coat film (Example 18) were produced in the same manner as in Example 5, except for using a primer layer paint obtained by further adding 30% of silica fine particle slurry "NanoTek Slurry (trade name)" (silica average particle diameter: 30 nm, a propylene glycol monomethyl ether solvent, solid content: 15%, produced by CIK NanoTek Corporation) to the primer layer paint of Example 5 as solid content. Moreover, the surface characteristics of the primer layer of the primer layer coating film were measured in the same manner as in Example 1.

The following Comparative Examples 1 to 4 are comparative examples for the second invention described above.

Comparative Example 1

A styrene acrylic resin "ARUFON-UG4040 (trade name)" (solid content: 100%, produced by Toagosei Co., Ltd.) was diluted with butyl acetate/toluene=85/15 (wt. %) until the solid content concentration (paint concentration) was 5.5% to prepare a primer layer paint.

The above primer layer paint was applied to one surface of Zeonor Film ZF14 (produced by Zeon Corporation) having a thickness of 40 μm, which was the same as that of Example 1, using a bar coater (#4), followed by hot-air drying in a drying furnace at 100° C. at a wind speed of 1 m/sec in the furnace for 60 seconds for drying and solidification to form a primer layer with a coating film thickness of 0.3 μm, thereby obtaining a primer layer coating film.

The surface characteristics of the primer layer of the primer layer coating film obtained in this manner were measured in the same manner as in Example 1.

Next, the primer layer of a primer layer coating film, which was produced in entirely the same manner as described above, was coated with the hard coat layer paint of Example 1 in the same manner as in Example 1, followed by curing by UV irradiation to form a hard coat layer, thereby producing a hard coat film of Comparative Example 1.

Comparative Example 2

A primer layer coating film and a hard coat film (Comparative Example 2) were produced in the same manner as in Comparative Example 1, except that the drying conditions after coating the primer layer paint of Comparative Example 1 were changed to hot-air drying in a drying furnace at 60° C. at a wind speed of 1 m/sec in the furnace for 60 seconds. Moreover, the surface characteristics of the primer layer of the primer layer coating film were measured in the same manner as in Example 1.

Comparative Example 3

A primer layer coating film and a hard coat film (Comparative Example 3) were produced in the same manner as in Comparative Example 1, except that the resin mixed with the primer layer paint of Comparative Example 1 was changed to an acrylic resin "THERMOLAC LG-45M-30 (trade name)" (solid content: 30%, produced by Soken Chemical & Engineering Co., Ltd.), and a primer layer paint having a solid content concentration of 5.5% was used. Moreover, the surface characteristics of the primer layer of the primer layer coating film were measured in the same manner as in Example 1.

Comparative Example 4

A primer layer coating film and a hard coat film (Comparative Example 4) were produced in the same manner as in Comparative Example 3, except that the drying conditions after coating the primer layer paint of Comparative Example 3 were changed to hot-air drying in a drying furnace at 60° C. at a wind speed of 1 m/sec in the furnace for 60 seconds. Moreover, the surface characteristics of the primer layer of the primer layer coating film were measured in the same manner as in Example 1.

The hard coat films of the Examples and Comparative Examples produced as described above were each evaluated for the following items, and the results were summarized in Table 1.

(1) Thickness of Coating Film

The formation thicknesses of the coating films of the primer layer and the hard coat layer were measured using Thin-Film Analyzer F20 (trade name) (produced by FIL-METRIC S).

(2) Adhesion (Initial Adhesion and Adhesion Over Time (Wet Heat Adhesion))

The initial adhesion was evaluated according to JIS-K5600-5-6. Specifically, 100 cross-cuts of 1 mm$^2$ were produced from each hard coat film using a cross-cut peel test jig under ordinary conditions, i.e., constant temperature and humidity conditions (23° C., 50% RH). Adhesive tape No. 252 produced by Sekisui Chemical Co., Ltd. was attached thereto, pressed uniformly with a spatula, and peeled in the direction of 60 degrees, and the number of remaining hard coat layers was evaluated in four stages. The evaluation criteria were as follows. The adhesion of products evaluated as ⊚ and ○ (i.e., the residual ratio of the hard coat layer:90% or more) was determined to be acceptable.

⊚: 100 cross-cuts
○: 99 to 90 cross-cuts
Δ: 89 to 50 cross-cuts
x: 49 to 0 cross-cuts Moreover, as for the wet heat adhesion (adhesion over time under wet heat conditions), after each hard coat film was stored for 30 days under wet heat conditions (80° C., 90% RH), a cross-cut peel test was performed in the same manner as described above. Then, the adhesion of the hard coat layer was evaluated in four stages. The evaluation criteria are the same as those in the case of the above initial adhesion.

(3) Pencil Hardness

The pencil hardness of each hard coat film was measured by the test method according to JIS-K-5600-5-4. Hardness without formation of scratches on the surface was measured. Regarding the evaluation criteria, a hardness of 3B or more was regarded as acceptable.

(4) Scratch Resistance

The hard coat layer surface of each hard coat film was subjected to 10 reciprocating frictions using steel wool #0000 at a load of 1 kg by the test method according to JIS-K-5600-5-10, and the degree of scratching was evaluated according to the following criteria. The scratch resistance of products evaluated as ○ was regarded as excellent. Products evaluated as A are also usable as products.

○: No scratches occur
Δ: Slight scratches occur
x: Innumerable scratches occur

TABLE 1

| | Primer paint | | | | | Primer layer coating conditions | |
|---|---|---|---|---|---|---|---|
| | Resin | | Additive | | Solid content | | |
| | Trade name | Component | Trade name | Additive rate (%) | concentration (%) | Bar coater coating | Drying conditions |
| Example 1 | UNISTOLE P-802 | Modified polyolefin | — | — | 7.0 | #4 | 100° C., 60 s, wind speed: 1 m/s |
| Example 2 | UNISTOLE P-901 | Modified polyolefin | — | — | 7.0 | #4 | 100° C., 60 s, wind speed: 1 m/s |
| Example 3 | UNISTOLE P-902 | Modified polyolefin | — | — | 7.0 | #4 | 100° C., 60 s, wind speed: 1 m/s |
| Example 4 | UNISTOLE P-902 | Modified polyolefin | — | — | 7.0 | #4 | 60° C., 60 s, wind speed: 1 m/s |
| Example 5 | UNISTOLE P-802 | Modified polyolefin | — | — | 5.5 | #4 | 100° C., 60 s, wind speed: 1 m/s |
| Example 6 | | | Ftergent 602A | 0.5 | | #4 | 100° C., 60 s, wind speed: 1 m/s |
| Example 7 | | | Megaface RS75 | | | #4 | 100° C., 60 s, wind speed: 1 m/s |
| Example 8 | UNISTOLE P-901 | Modified polyolefin | — | — | 5.5 | #4 | 100° C., 60 s, wind speed: 1 m/s |
| Example 9 | | | Ftergent 602A | 0.5 | | #4 | 100° C., 60 s, wind speed: 1 m/s |
| Example 10 | | | Megaface RS75 | | | #4 | 100° C., 60 s, wind speed: 1 m/s |
| Example 11 | UNISTOLE P-902 | Modified polyolefin | — | — | 5.5 | #4 | 100° C., 60 s, wind speed: 1 m/s |
| Example 12 | | | Ftergent 602A | 0.5 | | #4 | 100° C., 60 s, wind speed: 1 m/s |

TABLE 1-continued

| | | | | | | |
|---|---|---|---|---|---|---|
| Example 13 | | | Megaface RS75 | | | #4 | 100° C., 60 s, wind speed: 1 m/s |
| Example 14 | AUROREN S-5419T | Modified polyolefin | — | — | 3.0 | #4 | 100° C., 60 s, wind speed: 1 m/s |
| Example 15 | | | | | | #6 | 100° C., 60 s, wind speed: 1 m/s |
| Example 16 | UNISTOLE P-802 | Modified polyolefin | Megaface RS75 | 0.5 | 5.5 | #6 | 100° C., 60 s, wind speed: 1 m/s |
| Example 17 | | | | | | #10 | 100° C., 60 s, wind speed: 1 m/s |
| Example 18 | UNISTOLE P-802 | Modified polyolefin | NanoTek Slurry (silica average particle diameter: 30 nm) | 30 | 5.5 | #4 | 100° C., 60 s, wind speed: 1 m/s |
| Comparative Example 1 | ARUFON-UG4040 | Styrene acrylic | — | — | 5.5 | #4 | 100° C., 60 s, wind speed: 1 m/s |
| Comparative Example 2 | | | | | | #4 | 60° C., 60 s, wind speed: 1 m/s |
| Comparative Example 3 | THERMOLAC LG-45M-30 | Acrylic polymer | — | — | 5.5 | #4 | 100° C., 60 s, wind speed: 1 m/s |
| Comparative Example 4 | | | | | | #4 | 60° C., 60 s, wind speed: 1 m/s |

| | Primer layer thickness (μm) | Arithmetic average surface roughness [Ra] (nm) | Contact angle (°) Water | Contact angle (°) n-Hexadecane | Surface free energy (mN/m) | Friction coefficient Static friction coefficient | Friction coefficient Dynamic friction coefficient | Static friction coefficient/ dynamic friction coefficient |
|---|---|---|---|---|---|---|---|---|
| Example 1 | 0.4 | 2.6 | 99 | 16 | 27.4 | 1.30 | 1.14 | 1.14 |
| Example 2 | 0.4 | 3.4 | 89 | 29 | 28.1 | 1.15 | 1.03 | 1.12 |
| Example 3 | 0.4 | 4.8 | 100 | 12 | 27.6 | 1.20 | 1.19 | 1.01 |
| Example 4 | 0.4 | 6.3 | 100 | 12 | 27.6 | 1.10 | 1.04 | 1.05 |
| Example 5 | 0.3 | 2.6 | 95 | 14 | 28.4 | 1.42 | 0.96 | 1.48 |
| Example 6 | 0.3 | 2.2 | 83 | 33 | 27.7 | 1.34 | 1.03 | 1.30 |
| Example 7 | 0.3 | 1.9 | 94 | 42 | 23.9 | 1.50 | 1.38 | 1.09 |
| Example 8 | 0.3 | 3.4 | 96 | 24 | 27.0 | 0.98 | 0.41 | 2.38 |
| Example 9 | 0.3 | 2.7 | 77 | 45 | 31.1 | 0.97 | 0.44 | 2.20 |
| Example 10 | 0.3 | 2.6 | 73 | 44 | 33.8 | 0.92 | 0.45 | 2.06 |
| Example 11 | 0.3 | 4.4 | 100 | 12 | 27.7 | 0.92 | 0.64 | 1.45 |
| Example 12 | 0.3 | 3.5 | 94 | 28 | 26.8 | 0.95 | 0.63 | 1.51 |
| Example 13 | 0.3 | 3.0 | 95 | 37 | 24.8 | 0.95 | 0.62 | 1.52 |
| Example 14 | 0.2 | 2.7 | 98 | 12 | 27.9 | 1.31 | 0.67 | 1.97 |
| Example 15 | 0.3 | 4.5 | 97 | 11 | 28.3 | 1.08 | 0.52 | 2.06 |
| Example 16 | 0.6 | 2.3 | 92 | 48 | 26.1 | 1.28 | 1.01 | 1.27 |
| Example 17 | 1.0 | 2.4 | 86 | 48 | 28.3 | 1.32 | 1.02 | 1.29 |
| Example 18 | 0.3 | 3.9 | 100 | 12 | 27.7 | 1.34 | 1.18 | 1.14 |
| Comparative Example 1 | 0.3 | 2.7 | 86 | 11 | 31.3 | 0.54 | 0.45 | 1.20 |
| Comparative Example 2 | 0.3 | 6.6 | 87 | 12 | 30.9 | 0.52 | 0.55 | 0.94 |
| Comparative Example 3 | 0.3 | 2.9 | 72 | 11 | 37.3 | 0.51 | 0.56 | 0.91 |
| Comparative Example 4 | 0.3 | 5.4 | 72 | 12 | 37.7 | 0.58 | 0.58 | 1.00 |

| | Quality Initial adhesion | Quality Adhesion over time | Quality Pencil hardness | Quality Scratch resistance |
|---|---|---|---|---|
| Example 1 | ⊚ | ⊚ | Acceptable | ○ |
| Example 2 | ⊚ | ⊚ | Acceptable | ○ |
| Example 3 | ⊚ | ⊚ | Acceptable | ○ |
| Example 4 | ⊚ | ⊚ | Acceptable | ○ |
| Example 5 | ⊚ | ⊚ | Acceptable | ○ |
| Example 6 | ⊚ | ⊚ | Acceptable | ○ |
| Example 7 | ⊚ | ⊚ | Acceptable | ○ |
| Example 8 | ⊚ | ⊚ | Acceptable | ○ |
| Example 9 | ⊚ | ⊚ | Acceptable | ○ |
| Example 10 | ⊚ | ⊚ | Acceptable | ○ |
| Example 11 | ⊚ | ⊚ | Acceptable | ○ |
| Example 12 | ⊚ | ⊚ | Acceptable | ○ |
| Example 13 | ⊚ | ⊚ | Acceptable | ○ |
| Example 14 | ⊚ | ⊚ | Acceptable | ○ |
| Example 15 | ⊚ | ⊚ | Acceptable | ○ |
| Example 16 | ⊚ | ⊚ | Acceptable | ○ |
| Example 17 | ⊚ | ⊚ | Acceptable | ○ |

TABLE 1-continued

| | | | | |
|---|---|---|---|---|
| Example 18 | ◎ | ◎ | Acceptable | ○ |
| Comparative Example 1 | x | x | Unmeasurable | ○ |
| Comparative Example 2 | x | x | Unmeasurable | ○ |
| Comparative Example 3 | x | x | Unmeasurable | ○ |
| Comparative Example 4 | x | x | Unmeasurable | ○ |

As is clear from the results of Table 1 above, according to the Examples of the present invention, a hard coat film having excellent adhesion, particularly adhesion over time, to a hard coat layer can be obtained using a cycloolefin polymer film as a base material. Moreover, according to the Examples of the present invention, a hard coat film comprising a hard coat layer with excellent hardness (pencil hardness and scratch resistance) can be obtained.

In contrast, the hard coat films of the Comparative Examples, in which the static friction coefficient of their primer layer surfaces does not satisfy the range of the present invention (second Invention), particularly have inferior initial adhesion and adhesion over time, and their hard coat layers are likely to have adhesion failure. In the hard coat films of the Comparative Examples, the above pencil hardness test could not be properly evaluated due to the adhesion failure of the hard coat layers.

The following Examples 19 to 36 are examples corresponding to the first and eighth inventions described above.

Example 19

<Preparation of Primer Layer Paint>

A polyolefin resin (modified polyolefin) "UNISTOLE P-802 (trade name)" (solid content: 22%, produced by Mitsui Chemicals, Inc.) was diluted with butyl acetate/toluene=85/15 (wt. %) until the solid content concentration (paint concentration) was 7.0% to prepare a primer layer paint.

<Preparation of Hard Coat Layer Paint>

Using 100 parts of a urethane acrylate ultraviolet-curing resin "ARTRESIN UN-908 (trade name)" (solid content: 100%, number of (meth)acryloyloxy groups: 9, weight average molecular weight: 3600, produced by Negami Chemical Industrial Co., Ltd.) as a main agent, 3.5 parts of IRGACURE 184 (a photopolymerization initiator, produced by BASF), 2.5 parts of TINUVIN 292 (a hindered amine light stabilizer, produced by BASF), and 0.3 parts of a leveling agent Megaface RS75 (a fluorine leveling agent, produced by DIC Corporation) were diluted with butyl acetate/n-propyl alcohol=50/50 (parts by weight) until the solid content concentration of the ultraviolet-curing resin in the paint was 35%, followed by sufficient stirring to prepare a hard coat layer paint.

<Production of Primer Layer Coating Film>

The above primer layer paint was applied to one surface of Zeonor Film ZF14 (produced by Zeon Corporation) having a thickness of 40 µm as a cycloolefin film using a bar coater (#4), followed by hot-air drying in a drying furnace at 100° C. at a wind speed of 1 m/sec in the furnace for 60 seconds for drying and solidification to form a primer layer with a coating film thickness of 0.4 µm, thereby obtaining a primer layer coating film.

The surface characteristics (arithmetic average surface roughness (Ra), static friction coefficient, dynamic friction coefficient, ratio of static friction coefficient to dynamic friction coefficient (static friction coefficient/dynamic friction coefficient), contact angle of water, and surface free energy) of the primer layer of the primer layer coating film obtained in this manner were measured in the same manner as in Example 1 described above, and the results were summarized in Table 2 together with other Examples and Comparative Examples.

<Production of Hard Coat Film>

Next, the above hard coat layer paint was applied to the primer layer of a primer layer coating film, which was produced in entirely the same manner as described above, using a bar coater, followed by hot-air drying in a drying furnace at 80° C. for 1 minute to form a coating layer with a coating film thickness of 2.5 µm. This layer was cured using a UV irradiation device set at a height of 60 mm from the coating surface at a UV dose of 180 mJ/cm$^2$ to form a hard coat layer, thereby producing a hard coat film of the present Example.

Example 20

A primer layer coating film and a hard coat film (Example 20) were produced in the same manner as in Example 19, except that the resin mixed with the primer layer paint of Example 19 was changed to a polyolefin resin (modified polyolefin) "UNISTOLE P-901 (trade name)" (solid content: 22%, produced by Mitsui Chemicals, Inc.), and a primer layer paint having a solid content concentration of 7.0% was used. Moreover, the surface characteristics of the primer layer of the primer layer coating film were measured in the same manner as in Example 19.

Example 21

A primer layer coating film and a hard coat film (Example 21) were produced in the same manner as in Example 19, except that the resin mixed with the primer layer paint of Example 19 was changed to a polyolefin resin (modified polyolefin) "UNISTOLE P-902 (trade name)" (solid content: 22%, produced by Mitsui Chemicals, Inc.), and a primer layer paint having a solid content concentration of 7.0% was used. Moreover, the surface characteristics of the primer layer of the primer layer coating film were measured in the same manner as in Example 19.

Example 22

A primer layer coating film and a hard coat film (Example 22) were produced in the same manner as in Example 21, except that the drying conditions after coating the primer layer paint of Example 21 were changed to hot-air drying in a drying furnace at 60° C. at a wind speed of 1 m/sec in the furnace for 60 seconds. Moreover, the surface characteristics of the primer layer of the primer layer coating film were measured in the same manner as in Example 19.

Example 23

A primer layer coating film and a hard coat film (Example 23) were produced in the same manner as in Example 19, except that a primer layer paint mixed with the same polyolefin resin (modified polyolefin) "UNISTOLE P-802 (trade name)" (solid content: 22%, produced by Mitsui Chemicals, Inc.) as that of Example 19 and having a solid content concentration of 5.5% was used, and a primer layer with a coating film thickness of 0.3 µm was formed. Moreover, the surface characteristics of the primer layer of the primer layer coating film were measured in the same manner as in Example 19.

Example 24

A primer layer coating film and a hard coat film (Example 24) were produced in the same manner as in Example 23, except for using a primer layer paint obtained by further mixing 0.5% of a leveling agent Ftergent 602A (a fluorine leveling agent, produced by Neos Co., Ltd.) with the primer layer paint of Example 23. Moreover, the surface characteristics of the primer layer of the primer layer coating film were measured in the same manner as in Example 19.

Example 25

A primer layer coating film and a hard coat film (Example 25) were produced in the same manner as in Example 23, except for using a primer layer paint obtained by further mixing 0.5% of a leveling agent Megaface RS-75 (a fluorine leveling agent, produced by DIC Corporation) with the primer layer paint of Example 23. Moreover, the surface characteristics of the primer layer of the primer layer coating film were measured in the same manner as in Example 19.

Example 26

A primer layer coating film and a hard coat film (Example 26) were produced in the same manner as in Example 19, except that the resin mixed with the primer layer paint of Example 19 was changed to a polyolefin resin (modified polyolefin) "UNISTOLE P-901 (trade name)" (solid content: 22%, produced by Mitsui Chemicals, Inc.), a primer layer paint having a solid content concentration of 5.5% was used, and a primer layer with a coating film thickness of 0.3 µm was formed. Moreover, the surface characteristics of the primer layer of the primer layer coating film were measured in the same manner as in Example 19.

Example 27

A primer layer coating film and a hard coat film (Example 27) were produced in the same manner as in Example 26, except for using a primer layer paint obtained by further mixing 0.5% of a leveling agent Ftergent 602A (a fluorine leveling agent, produced by Neos Co., Ltd.) with the primer layer paint of Example 26. Moreover, the surface characteristics of the primer layer of the primer layer coating film were measured in the same manner as in Example 19.

Example 28

A primer layer coating film and a hard coat film (Example 28) were produced in the same manner as in Example 26, except for using a primer layer paint obtained by further mixing 0.5% of a leveling agent Megaface RS-75 (a fluorine leveling agent, produced by DIC Corporation) with the primer layer paint of Example 26. Moreover, the surface characteristics of the primer layer of the primer layer coating film were measured in the same manner as in Example 19.

Example 29

A primer layer coating film and a hard coat film (Example 29) were produced in the same manner as in Example 19, except that the resin mixed with the primer layer paint of Example 19 was changed to a polyolefin resin (modified polyolefin) "UNISTOLE P-902 (trade name)" (solid content: 22%, produced by Mitsui Chemicals, Inc.), a primer layer paint having a solid content concentration of 5.5% was used, and a primer layer with a coating film thickness of 0.3 µm was formed. Moreover, the surface characteristics of the primer layer of the primer layer coating film were measured in the same manner as in Example 19.

Example 30

A primer layer coating film and a hard coat film (Example 30) were produced in the same manner as in Example 29, except for using a primer layer paint obtained by further mixing 0.5% of a leveling agent Ftergent 602A (a fluorine leveling agent, produced by Neos Co., Ltd.) with the primer layer paint of Example 29. Moreover, the surface characteristics of the primer layer of the primer layer coating film were measured in the same manner as in Example 19.

Example 31

A primer layer coating film and a hard coat film (Example 31) were produced in the same manner as in Example 29, except for using a primer layer paint obtained by further mixing 0.5% of a leveling agent Megaface RS-75 (a fluorine leveling agent, produced by DIC Corporation) with the primer layer paint of Example 29. Moreover, the surface characteristics of the primer layer of the primer layer coating film were measured in the same manner as in Example 19.

Example 32

A primer layer coating film and a hard coat film (Example 32) were produced by forming a primer layer with a coating thickness of 0.2 µm by primer layer coating in the same manner as in Example 19, except that the resin mixed with the primer layer paint of Example 19 was changed to a polyolefin resin (modified polyolefin) "AUROREN S-5419T (trade name)" (solid content: 15%, produced by Nippon Paper Industries Co., Ltd.), and a primer layer paint having a solid content concentration of 3.0% was used. Moreover, the surface characteristics of the primer layer of the primer layer coating film were measured in the same manner as in Example 19.

Example 33

A primer layer coating film and a hard coat film (Example 33) were produced in the same manner as in Example 32, except that the primer layer paint of Example 32 was applied using a bar coater (#6) to form a primer layer with a coating film thickness of 0.3 µm. Moreover, the surface characteristics of the primer layer of the primer layer coating film were measured in the same manner as in Example 19.

Example 34

A primer layer coating film and a hard coat film (Example 34) were produced in the same manner as in Example 25, except that the primer layer paint of Example 25 was applied using a bar coater (#6) to form a primer layer with a coating film thickness of 0.6 µm. Moreover, the surface characteristics of the primer layer of the primer layer coating film were measured in the same manner as in Example 19.

Example 35

A primer layer coating film and a hard coat film (Example 35) were produced in the same manner as in Example 25, except that the primer layer paint of Example 25 was applied using a bar coater (#10) to form a primer layer with a coating film thickness of 1.0 µm. Moreover, the surface characteristics of the primer layer of the primer layer coating film were measured in the same manner as in Example 19.

Example 36

A primer layer coating film and a hard coat film (Example 36) were produced in the same manner as in Example 23, except for using a primer layer paint obtained by further adding 30% of silica fine particle slurry "NanoTek Slurry (trade name)" (silica average particle diameter: 30 nm, a propylene glycol monomethyl ether solvent, solid content: 15%, produced by CIK NanoTek Corporation) to the primer layer paint of Example 23 as solid content. Moreover, the surface characteristics of the primer layer of the primer layer coating film were measured in the same manner as in Example 19.

The following Comparative Examples 5 and 6 are comparative examples for the eighth invention described above.

Comparative Example 5

30% of styrene fine particles "Techpolymer XX-45HX (trade name)" was added to a styrene acrylic resin "ARUFON-UG4040 (trade name)" (solid content: 100%, produced by Toagosei Co., Ltd.) as solid content, and the resulting mixture was diluted with butyl acetate/toluene=85/15 (wt. %) until the solid content concentration (paint concentration) was 5.5% to prepare a primer layer paint.

The above primer layer paint was applied to one surface of Zeonor Film ZF14 (produced by Zeon Corporation) having a thickness of 40 µm, which was the same as that of Example 19, using a bar coater (#4), followed by hot-air drying in a drying furnace at 100° C. at a wind speed of 1 m/sec in the furnace for 60 seconds for drying and solidification to form a primer layer with a coating film thickness of 0.3 µm, thereby obtaining a primer layer coating film.

The surface characteristics of the primer layer of the primer layer coating film obtained in this manner were measured in the same manner as in Example 19.

Next, the primer layer of a primer layer coating film, which was produced in entirely the same manner as described above, was coated with the hard coat layer paint of Example 19 in the same manner as in Example 19, followed by curing by UV irradiation to form a hard coat layer, thereby producing a hard coat film of Comparative Example 5.

Comparative Example 6

A primer layer coating film and a hard coat film (Comparative Example 6) were produced in the same manner as in Comparative Example 5, except that the resin mixed with the primer layer paint of Comparative Example 5 was changed to an acrylic resin "THERMOLAC LG-45M-30 (trade name)" (solid content: 30%, produced by Soken Chemical & Engineering Co., Ltd.), and a primer layer paint having a solid content concentration of 5.5% was used. Moreover, the surface characteristics of the primer layer of the primer layer coating film were measured in the same manner as in Example 19.

The hard coat films of the Examples and Comparative Examples produced as described above were each evaluated for the same items in the same manner as in Example 1 etc., and the results were summarized in Table 2.

TABLE 2

| | Primer paint | | | | | Primer layer coating conditions | |
|---|---|---|---|---|---|---|---|
| | Resin | | Additive | | Solid content | Bar coater | |
| | Trade name | Component | Trade name | Additive rate (%) | concentration (%) | coating | Drying conditions |
| Example 19 | UNISTOLE P-802 | Modified polyolefin | — | — | 7.0 | #4 | 100° C., 60 s, wind speed: 1 m/s |
| Example 20 | UNISTOLE P-901 | Modified polyolefin | — | — | 7.0 | #4 | 100° C., 60 s, wind speed: 1 m/s |
| Example 21 | UNISTOLE P-902 | Modified polyolefin | — | — | 7.0 | #4 | 100° C., 60 s, wind speed: 1 m/s |
| Example 22 | UNISTOLE P-902 | Modified polyolefin | — | — | 7.0 | #4 | 60° C., 60 s, wind speed: 1 m/s |
| Example 23 | UNISTOLE P-802 | Modified polyolefin | — | — | 5.5 | #4 | 100° C., 60 s, wind speed: 1 m/s |
| Example 24 | | | Ftergent 602A | 0.5 | | #4 | 100° C., 60 s, wind speed: 1 m/s |
| Example 25 | | | Megaface RS75 | | | #4 | 100° C., 60 s, wind speed: 1 m/s |
| Example 26 | UNISTOLE P-901 | Modified polyolefin | — | — | 5.5 | #4 | 100° C., 60 s, wind speed: 1 m/s |
| Example 27 | | | Ftergent 602A | 0.5 | | #4 | 100° C., 60 s, wind speed: 1 m/s |

TABLE 2-continued

| | | | | | | | |
|---|---|---|---|---|---|---|---|
| Example 28 | | | Megaface RS75 | | | #4 | 100° C., 60 s, wind speed: 1 m/s |
| Example 29 | UNISTOLE P-902 | Modified polyolefin | — | — | 5.5 | #4 | 100° C., 60 s, wind speed: 1 m/s |
| Example 30 | | | Ftergent 602A | 0.5 | | #4 | 100° C., 60 s, wind speed: 1 m/s |
| Example 31 | | | Megaface RS75 | | | #4 | 100° C., 60 s, wind speed: 1 m/s |
| Example 32 | AUROREN S-5419T | Modified polyolefin | — | — | 3.0 | #4 | 100° C., 60 s, wind speed: 1 m/s |
| Example 33 | | | | | | #6 | 100° C., 60 s, wind speed: 1 m/s |
| Example 34 | UNISTOLE P-802 | Modified polyolefin | Megaface RS75 | 0.5 | 5.5 | #6 | 100° C., 60 s, wind speed: 1 m/s |
| Example 35 | | | | | | #10 | 100° C., 60 s, wind speed: 1 m/s |
| Example 36 | UNISTOLE P-802 | Modified polyolefin | NanoTek Slurry (silica average particle diameter: 30 nm) | 30 | 5.5 | #4 | 100° C., 60 s, wind speed: 1 m/s |
| Comparative Example 5 | ARUFON-UG4040 | Styrene acrylic | Techpolymer XX-45HX | 30 | 5.5 | #4 | 100° C., 60 s, wind speed: 1 m/s |
| Comparative Example 6 | THERMOLAC LG-45M-30 | Acrylic | | 30 | | #4 | 100° C., 60 s, wind speed: 1 m/s |

| | Primer layer thickness (μm) | Arithmetic average surface roughness [Ra] (nm) | Contact angle (°) Water | Contact angle (°) n-Hexadecane | Surface free energy (mN/m) | Static friction coefficient | Dynamic friction coefficient | Static friction coefficient/ dynamic friction coefficient |
|---|---|---|---|---|---|---|---|---|
| Example 19 | 0.4 | 2.6 | 99 | 16 | 27.4 | 1.30 | 1.14 | 1.14 |
| Example 20 | 0.4 | 3.4 | 89 | 29 | 28.1 | 1.15 | 1.03 | 1.12 |
| Example 21 | 0.4 | 4.8 | 100 | 12 | 27.6 | 1.20 | 1.19 | 1.01 |
| Example 22 | 0.4 | 6.3 | 100 | 12 | 27.6 | 1.10 | 1.04 | 1.05 |
| Example 23 | 0.3 | 2.6 | 95 | 14 | 28.4 | 1.42 | 0.96 | 1.48 |
| Example 24 | 0.3 | 2.2 | 83 | 33 | 27.7 | 1.34 | 1.03 | 1.30 |
| Example 25 | 0.3 | 1.9 | 94 | 42 | 23.9 | 1.50 | 1.38 | 1.09 |
| Example 26 | 0.3 | 3.4 | 96 | 24 | 27.0 | 0.98 | 0.41 | 2.38 |
| Example 27 | 0.3 | 2.7 | 77 | 45 | 31.1 | 0.97 | 0.44 | 2.20 |
| Example 28 | 0.3 | 2.6 | 73 | 44 | 33.8 | 0.92 | 0.45 | 2.06 |
| Example 29 | 0.3 | 4.4 | 100 | 12 | 27.7 | 0.92 | 0.64 | 1.45 |
| Example 30 | 0.3 | 3.5 | 94 | 28 | 26.8 | 0.95 | 0.63 | 1.51 |
| Example 31 | 0.3 | 3.0 | 95 | 37 | 24.8 | 0.95 | 0.62 | 1.52 |
| Example 32 | 0.2 | 2.7 | 98 | 12 | 27.9 | 1.31 | 0.67 | 1.97 |
| Example 33 | 0.3 | 4.5 | 97 | 11 | 28.3 | 1.08 | 0.52 | 2.06 |
| Example 34 | 0.6 | 2.3 | 92 | 48 | 26.1 | 1.28 | 1.01 | 1.27 |
| Example 35 | 1.0 | 2.4 | 86 | 48 | 28.3 | 1.32 | 1.02 | 1.29 |
| Example 36 | 0.3 | 3.9 | 100 | 12 | 27.7 | 1.34 | 1.18 | 1.14 |
| Comparative Example 5 | 0.3 | 25.0 | 91 | 9 | 29.9 | 0.22 | 0.34 | 0.65 |
| Comparative Example 6 | 0.3 | 64.0 | 76 | 9 | 35.8 | 0.20 | 0.26 | 0.77 |

| | Quality | | | |
|---|---|---|---|---|
| | Initial adhesion | Adhesion over time | Pencil hardness | Scratch resistance |
| Example 19 | ⊚ | ⊚ | Acceptable | ○ |
| Example 20 | ⊚ | ⊚ | Acceptable | ○ |
| Example 21 | ⊚ | ⊚ | Acceptable | ○ |
| Example 22 | ⊚ | ⊚ | Acceptable | ○ |
| Example 23 | ⊚ | ⊚ | Acceptable | ○ |
| Example 24 | ⊚ | ⊚ | Acceptable | ○ |
| Example 25 | ⊚ | ⊚ | Acceptable | ○ |
| Example 26 | ⊚ | ⊚ | Acceptable | ○ |
| Example 27 | ⊚ | ⊚ | Acceptable | ○ |
| Example 28 | ⊚ | ⊚ | Acceptable | ○ |
| Example 29 | ⊚ | ⊚ | Acceptable | ○ |
| Example 30 | ⊚ | ⊚ | Acceptable | ○ |
| Example 31 | ⊚ | ⊚ | Acceptable | ○ |
| Example 32 | ⊚ | ⊚ | Acceptable | ○ |
| Example 33 | ⊚ | ⊚ | Acceptable | ○ |
| Example 34 | ⊚ | ⊚ | Acceptable | ○ |

TABLE 2-continued

|  | Example 35 | ◎ | ◎ | Acceptable | ○ |
|---|---|---|---|---|---|
|  | Example 36 | ◎ | ◎ | Acceptable | ○ |
|  | Comparative Example 5 | x | x | Unmeasurable | ○ |
|  | Comparative Example 6 | x | x | Unmeasurable | ○ |

As is clear from the results of Table 2 above, according to the Examples of the present invention, a hard coat film having excellent adhesion, particularly adhesion over time, to a hard coat layer can be obtained using a cycloolefin polymer film as a base material. Moreover, according to the Examples of the present invention, a hard coat film comprising a hard coat layer with excellent hardness (pencil hardness and scratch resistance) can be obtained.

In contrast, the hard coat films of the Comparative Examples, in which the arithmetic average surface roughness (Ra) of their primer layers does not satisfy the range of the present invention (eighth Invention), particularly have inferior initial adhesion and adhesion over time, and their hard coat layers are likely to have adhesion failure. In the hard coat films of the Comparative Examples, the above pencil hardness could not be properly measured due to the adhesion failure of the hard coat layers.

The following Examples 37 to 54 are examples corresponding to the first and thirteenth inventions described above.

Example 37

<Preparation of Primer Layer Paint>

A polyolefin resin (modified polyolefin) "UNISTOLE P-802 (trade name)" (solid content: 22%, produced by Mitsui Chemicals, Inc.) was diluted with butyl acetate/toluene=85/15 (wt. %) until the solid content concentration (paint concentration) was 7.0% to prepare a primer layer paint.

<Preparation of Hard Coat Layer Paint>

Using 100 parts of a urethane acrylate ultraviolet-curing resin "ARTRESIN UN-908 (trade name)" (solid content: 100%, number of (meth)acryloyloxy groups: 9, weight average molecular weight: 3600, produced by Negami Chemical Industrial Co., Ltd.) as a main agent, 3.5 parts of IRGACURE 184 (a photopolymerization initiator, produced by BASF), 2.5 parts of TINUVIN 292 (a hindered amine light stabilizer, produced by BASF), and 0.3 parts of a leveling agent Megaface RS75 (a fluorine leveling agent, produced by DIC Corporation) were diluted with butyl acetate/n-propyl alcohol=50/50 (parts by weight) until the solid content concentration of the ultraviolet-curing resin in the paint was 35%, followed by sufficient stirring to prepare a hard coat layer paint.

<Production of Primer Layer Coating Film>

The above primer layer paint was applied to one surface of Zeonor Film ZF14 (produced by Zeon Corporation) having a thickness of 40 μm as a cycloolefin film using a bar coater (#4), followed by hot-air drying in a drying furnace at 100° C. at a wind speed of 1 m/sec in the furnace for 60 seconds for drying and solidification to form a primer layer with a coating film thickness of 0.4 μm, thereby obtaining a primer layer coating film.

The surface characteristics of the primer layer of the primer layer coating film obtained in this manner were measured for the same items in the same manner as in Example 1 etc. The results were summarized in Table 3 together with other Examples and Comparative Examples.

<Production of Hard Coat Film>

Next, the above hard coat layer paint was applied to the primer layer of a primer layer coating film, which was produced in entirely the same manner as described above, using a bar coater, followed by hot-air drying in a drying furnace at 80° C. for 1 minute to form a coating layer with a coating film thickness of 2.5 μm. This layer was cured using a UV irradiation device set at a height of 60 mm from the coating surface at a UV dose of 180 mJ/cm$^2$ to form a hard coat layer, thereby producing a hard coat film of the present Example.

Example 38

A primer layer coating film and a hard coat film (Example 38) were produced in the same manner as in Example 37, except that the resin mixed with the primer layer paint of Example 37 was changed to a polyolefin resin (modified polyolefin) "UNISTOLE P-901 (trade name)" (solid content: 22%, produced by Mitsui Chemicals, Inc.), and a primer layer paint having a solid content concentration of 7.0% was used. Moreover, the surface characteristics of the primer layer of the primer layer coating film were measured in the same manner as in Example 37.

Example 39

A primer layer coating film and a hard coat film (Example 39) were produced in the same manner as in Example 37, except that the resin mixed with the primer layer paint of Example 37 was changed to a polyolefin resin (modified polyolefin) "UNISTOLE P-902 (trade name)" (solid content: 22%, produced by Mitsui Chemicals, Inc.), and a primer layer paint having a solid content concentration of 7.0% was used. Moreover, the surface characteristics of the primer layer of the primer layer coating film were measured in the same manner as in Example 37.

Example 40

A primer layer coating film and a hard coat film (Example 40) were produced in the same manner as in Example 39, except that the drying conditions after coating the primer layer paint of Example 39 were changed to hot-air drying in a drying furnace at 60° C. at a wind speed of 1 m/sec in the furnace for 60 seconds. Moreover, the surface characteristics of the primer layer of the primer layer coating film were measured in the same manner as in Example 37.

Example 41

A primer layer coating film and a hard coat film (Example 41) were produced in the same manner as in Example 37, except that a primer layer paint mixed with the same polyolefin resin (modified polyolefin) "UNISTOLE P-802 (trade name)" (solid content: 22%, produced by Mitsui Chemicals, Inc.) as that of Example 37 and having a solid content concentration of 5.5% was used, and a primer layer with a coating film thickness of 0.3 μm was formed. Moreover, the surface characteristics of the primer layer of the primer layer coating film were measured in the same manner as in Example 37.

Example 42

A primer layer coating film and a hard coat film (Example 42) were produced in the same manner as in Example 41, except for using a primer layer paint obtained by further mixing 0.5% of a leveling agent Ftergent 602A (a fluorine leveling agent, produced by Neos Co., Ltd.) with the primer layer paint of Example 41. Moreover, the surface characteristics of the primer layer of the primer layer coating film were measured in the same manner as in Example 37.

Example 43

A primer layer coating film and a hard coat film (Example 43) were produced in the same manner as in Example 41, except for using a primer layer paint obtained by further mixing 0.5% of a leveling agent Megaface RS-75 (a fluorine leveling agent, produced by DIC Corporation) with the primer layer paint of Example 41. Moreover, the surface characteristics of the primer layer of the primer layer coating film were measured in the same manner as in Example 37.

Example 44

A primer layer coating film and a hard coat film (Example 44) were produced in the same manner as in Example 37, except that the resin mixed with the primer layer paint of Example 37 was changed to a polyolefin resin (modified polyolefin) "UNISTOLE P-901 (trade name)" (solid content: 22%, produced by Mitsui Chemicals, Inc.), a primer layer paint having a solid content concentration of 5.5% was used, and a primer layer with a coating film thickness of 0.3 μm was formed. Moreover, the surface characteristics of the primer layer of the primer layer coating film were measured in the same manner as in Example 37.

Example 45

A primer layer coating film and a hard coat film (Example 45) were produced in the same manner as in Example 44, except for using a primer layer paint obtained by further mixing 0.5% of a leveling agent Ftergent 602A (a fluorine leveling agent, produced by Neos Co., Ltd.) with the primer layer paint of Example 44. Moreover, the surface characteristics of the primer layer of the primer layer coating film were measured in the same manner as in Example 37.

Example 46

A primer layer coating film and a hard coat film (Example 46) were produced in the same manner as in Example 44, except for using a primer layer paint obtained by further mixing 0.5% of a leveling agent Megaface RS-75 (a fluorine leveling agent, produced by DIC Corporation) with the primer layer paint of Example 44. Moreover, the surface characteristics of the primer layer of the primer layer coating film were measured in the same manner as in Example 37.

Example 47

A primer layer coating film and a hard coat film (Example 47) were produced in the same manner as in Example 37, except that the resin mixed with the primer layer paint of Example 37 was changed to a polyolefin resin (modified polyolefin) "UNISTOLE P-902 (trade name)" (solid content: 22%, produced by Mitsui Chemicals, Inc.), a primer layer paint having a solid content concentration of 5.5% was used, and a primer layer with a coating film thickness of 0.3 μm was formed. Moreover, the surface characteristics of the primer layer of the primer layer coating film were measured in the same manner as in Example 37.

Example 48

A primer layer coating film and a hard coat film (Example 48) were produced in the same manner as in Example 47, except for using a primer layer paint obtained by further mixing 0.5% of a leveling agent Ftergent 602A (a fluorine leveling agent, produced by Neos Co., Ltd.) with the primer layer paint of Example 47. Moreover, the surface characteristics of the primer layer of the primer layer coating film were measured in the same manner as in Example 37.

Example 49

A primer layer coating film and a hard coat film (Example 49) were produced in the same manner as in Example 47, except for using a primer layer paint obtained by further mixing 0.5% of a leveling agent Megaface RS-75 (a fluorine leveling agent, produced by DIC Corporation) with the primer layer paint of Example 47. Moreover, the surface characteristics of the primer layer of the primer layer coating film were measured in the same manner as in Example 37.

Example 50

A primer layer coating film and a hard coat film (Example 50) were produced by forming a primer layer with a coating thickness of 0.2 μm by primer layer coating in the same manner as in Example 37, except that the resin mixed with the primer layer paint of Example 37 was changed to a polyolefin resin (modified polyolefin) "AUROREN S-5419T (trade name)" (solid content: 15%, produced by Nippon Paper Industries Co., Ltd.), and a primer layer paint having a solid content concentration of 3.0% was used. Moreover, the surface characteristics of the primer layer of the primer layer coating film were measured in the same manner as in Example 37.

Example 51

A primer layer coating film and a hard coat film (Example 51) were produced in the same manner as in Example 50, except that the primer layer paint of Example 50 was applied using a bar coater (#6) to form a primer layer with a coating film thickness of 0.3 μm. Moreover, the surface characteristics of the primer layer of the primer layer coating film were measured in the same manner as in Example 37.

Example 52

A primer layer coating film and a hard coat film (Example 52) were produced in the same manner as in Example 43, except that the primer layer paint of Example 43 was applied using a bar coater (#6) to form a primer layer with a coating film thickness of 0.6 μm. Moreover, the surface characteristics of the primer layer of the primer layer coating film were measured in the same manner as in Example 37.

Example 53

A primer layer coating film and a hard coat film (Example 53) were produced in the same manner as in Example 43, except that the primer layer paint of Example 43 was applied using a bar coater (#10) to form a primer layer with a coating film thickness of 1.0 μm. Moreover, the surface characteristics of the primer layer of the primer layer coating film were measured in the same manner as in Example 37.

Example 54

A primer layer coating film and a hard coat film (Example 54) were produced in the same manner as in Example 41, except for using a primer layer paint obtained by further adding 30% of silica fine particle slurry "NanoTek Slurry (trade name)" (silica average particle diameter: 30 nm, a propylene glycol monomethyl ether solvent, solid content: 15%, produced by CIK NanoTek Corporation) to the primer layer paint of Example 41 as solid content. Moreover, the surface characteristics of the primer layer of the primer layer coating film were measured in the same manner as in Example 37.

The following Comparative Examples 7 and 8 are comparative examples for the thirteenth invention described above.

Comparative Example 7

A styrene acrylic resin "ARUFON-UG4040 (trade name)" (solid content: 100%, produced by Toagosei Co., Ltd.) was diluted with butyl acetate/toluene=85/15 (wt. %) until the solid content concentration (paint concentration) was 5.5%, and 1.0% of a leveling agent Megaface RS-90 (a fluorine leveling agent, produced by DIC Corporation) was further mixed to prepare a primer layer paint.

The above primer layer paint was applied to one surface of Zeonor Film ZF14 (produced by Zeon Corporation) having a thickness of 40 μm, which was the same as that of Example 37, using a bar coater (#4), followed by hot-air drying in a drying furnace at 100° C. at a wind speed of 1 m/sec in the furnace for 60 seconds for drying and solidification to form a primer layer with a coating film thickness of 0.3 μm, thereby obtaining a primer layer coating film.

The surface characteristics of the primer layer of the primer layer coating film obtained in this manner were measured in the same manner as in Example 37.

Next, the primer layer of a primer layer coating film, which was produced in entirely the same manner as described above, was coated with the hard coat layer paint of Example 37 in the same manner as in Example 1, followed by curing by UV irradiation to form a hard coat layer, thereby producing a hard coat film of Comparative Example 7.

Comparative Example 8

A primer layer coating film and a hard coat film (Comparative Example 8) were produced in the same manner as in Comparative Example 7, except that the resin mixed with the primer layer paint of Comparative Example 7 was changed to an acrylic resin "THERMOLAC LG-45M-30 (trade name)" (solid content: 30%, produced by Soken Chemical & Engineering Co., Ltd.), and a primer layer paint having a solid content concentration of 5.5% was used. Moreover, the surface characteristics of the primer layer of the primer layer coating film were measured in the same manner as in Example 37.

The hard coat films of the Examples and Comparative Examples produced as described above were each evaluated for the same items in the same manner as in Example 1 etc., and the results were summarized in Table 3.

TABLE 3

| | Primer paint | | | | | Primer layer coating conditions | |
|---|---|---|---|---|---|---|---|
| | Resin | | Additive | | Solid content | | |
| | Trade name | Component | Trade name | Additive rate (%) | concentration (%) | Bar coater coating | Drying conditions |
| Example 37 | UNISTOLE P-802 | Modified polyolefin | — | — | 7.0 | #4 | 100° C., 60 s, wind speed: 1 m/s |
| Example 38 | UNISTOLE P-901 | Modified polyolefin | — | — | 7.0 | #4 | 100° C., 60 s, wind speed: 1 m/s |
| Example 39 | UNISTOLE P-902 | Modified polyolefin | — | — | 7.0 | #4 | 100° C., 60 s, wind speed: 1 m/s |
| Example 40 | UNISTOLE P-902 | Modified polyolefin | — | — | 7.0 | #4 | 60° C., 60 s, wind speed: 1 m/s |
| Example 41 | UNISTOLE P-802 | Modified polyolefin | — | — | 5.5 | #4 | 100° C., 60 s, wind speed: 1 m/s |
| Example 42 | | | Ftergent 602A | 0.5 | | #4 | 100° C., 60 s, wind speed: 1 m/s |
| Example 43 | | | Megaface RS75 | | | #4 | 100° C., 60 s, wind speed: 1 m/s |
| Example 44 | UNISTOLE P-901 | Modified polyolefin | — | — | 5.5 | #4 | 100° C., 60 s, wind speed: 1 m/s |
| Example 45 | | | Ftergent 602A | 0.5 | | #4 | 100° C., 60 s, wind speed: 1 m/s |
| Example 46 | | | Megaface RS75 | | | #4 | 100° C., 60 s, wind speed: 1 m/s |
| Example 47 | UNISTOLE P-902 | Modified polyolefin | — | — | 5.5 | #4 | 100° C., 60 s, wind speed: 1 m/s |
| Example 48 | | | Ftergent 602A | 0.5 | | #4 | 100° C., 60 s, wind speed: 1 m/s |
| Example 49 | | | Megaface RS75 | | | #4 | 100° C., 60 s, wind speed: 1 m/s |

TABLE 3-continued

| | | | | | | | |
|---|---|---|---|---|---|---|---|
| Example 50 | AUROREN S-5419T | Modified polyolefin | — | — | 3.0 | #4 | 100° C., 60 s, wind speed: 1 m/s |
| Example 51 | | | | | | #6 | 100° C., 60 s, wind speed: 1 m/s |
| Example 52 | UNISTOLE P-802 | Modified polyolefin | Megaface RS75 | 0.5 | 5.5 | #6 | 100° C., 60 s, wind speed: 1 m/s |
| Example 53 | | | | | | #10 | 100° C., 60 s, wind speed: 1 m/s |
| Example 54 | UNISTOLE P-802 | Modified polyolefin | NanoTek Slurry (silica average particle diameter: 30 nm) | 30 | 5.5 | #4 | 100° C., 60 s, wind speed: 1 m/s |
| Comparative Example 7 | ARUFON-UG4040 | Styrene acrylic | Megaface RS90 | 1.0 | 5.5 | #4 | 100° C., 60 s, wind speed: 1 m/s |
| Comparative Example 8 | THERMOLAC LG-45M-30 | Acrylic | | | | #4 | 100° C., 60 s, wind speed: 1 m/s |

| | Primer layer thickness (μm) | Arithmetic average surface roughness [Ra] (nm) | Contact angle (°) Water | Contact angle (°) n-Hexadecane | Surface free energy (mN/m) | Friction coefficient Static friction coefficient | Friction coefficient Dynamic friction coefficient | Static friction coefficient/ dynamic friction coefficient |
|---|---|---|---|---|---|---|---|---|
| Example 37 | 0.4 | 2.6 | 99 | 16 | 27.4 | 1.30 | 1.14 | 1.14 |
| Example 38 | 0.4 | 3.4 | 89 | 29 | 28.1 | 1.15 | 1.03 | 1.12 |
| Example 39 | 0.4 | 4.8 | 100 | 12 | 27.6 | 1.20 | 1.19 | 1.01 |
| Example 40 | 0.4 | 6.3 | 100 | 12 | 27.6 | 1.10 | 1.04 | 1.05 |
| Example 41 | 0.3 | 2.6 | 95 | 14 | 28.4 | 1.42 | 0.96 | 1.48 |
| Example 42 | 0.3 | 2.2 | 83 | 33 | 27.7 | 1.34 | 1.03 | 1.30 |
| Example 43 | 0.3 | 1.9 | 94 | 42 | 23.9 | 1.50 | 1.38 | 1.09 |
| Example 44 | 0.3 | 3.4 | 96 | 24 | 27.0 | 0.98 | 0.41 | 2.38 |
| Example 45 | 0.3 | 2.7 | 77 | 45 | 31.1 | 0.97 | 0.44 | 2.20 |
| Example 46 | 0.3 | 2.6 | 73 | 44 | 33.8 | 0.92 | 0.45 | 2.06 |
| Example 47 | 0.3 | 4.4 | 100 | 12 | 27.7 | 0.92 | 0.64 | 1.45 |
| Example 48 | 0.3 | 3.5 | 94 | 28 | 26.8 | 0.95 | 0.63 | 1.51 |
| Example 49 | 0.3 | 3.0 | 95 | 37 | 24.8 | 0.95 | 0.62 | 1.52 |
| Example 50 | 0.2 | 2.7 | 98 | 12 | 27.9 | 1.31 | 0.67 | 1.97 |
| Example 51 | 0.3 | 4.5 | 97 | 11 | 28.3 | 1.08 | 0.52 | 2.06 |
| Example 52 | 0.6 | 2.3 | 92 | 48 | 26.1 | 1.28 | 1.01 | 1.27 |
| Example 53 | 1.0 | 2.4 | 86 | 48 | 28.3 | 1.32 | 1.02 | 1.29 |
| Example 54 | 0.3 | 3.9 | 100 | 12 | 27.7 | 1.34 | 1.18 | 1.14 |
| Comparative Example 7 | 0.3 | 4.5 | 96 | 60 | 19.3 | 0.35 | 0.76 | 0.46 |
| Comparative Example 8 | 0.3 | 4.0 | 103 | 57 | 18.3 | 0.41 | 0.58 | 0.71 |

| | Quality Initial adhesion | Quality Adhesion over time | Quality Pencil hardness | Quality Scratch resistance |
|---|---|---|---|---|
| Example 37 | ⊚ | ⊚ | Acceptable | ○ |
| Example 38 | ⊚ | ⊚ | Acceptable | ○ |
| Example 39 | ⊚ | ⊚ | Acceptable | ○ |
| Example 40 | ⊚ | ⊚ | Acceptable | ○ |
| Example 41 | ⊚ | ⊚ | Acceptable | ○ |
| Example 42 | ⊚ | ⊚ | Acceptable | ○ |
| Example 43 | ⊚ | ⊚ | Acceptable | ○ |
| Example 44 | ⊚ | ⊚ | Acceptable | ○ |
| Example 45 | ⊚ | ⊚ | Acceptable | ○ |
| Example 46 | ⊚ | ⊚ | Acceptable | ○ |
| Example 47 | ⊚ | ⊚ | Acceptable | ○ |
| Example 48 | ⊚ | ⊚ | Acceptable | ○ |
| Example 49 | ⊚ | ⊚ | Acceptable | ○ |
| Example 50 | ⊚ | ⊚ | Acceptable | ○ |
| Example 51 | ⊚ | ⊚ | Acceptable | ○ |
| Example 52 | ⊚ | ⊚ | Acceptable | ○ |
| Example 53 | ⊚ | ⊚ | Acceptable | ○ |
| Example 54 | ⊚ | ⊚ | Acceptable | ○ |
| Comparative Example 7 | x | x | Unmeasurable | ○ |
| Comparative Example 8 | x | x | Unmeasurable | ○ |

As is clear from the results of Table 3 above, according to the Examples of the present invention, a hard coat film having excellent adhesion, particularly adhesion over time, to a hard coat layer can be obtained using a cycloolefin polymer film as a base material. Moreover, according to the Examples of the present invention, a hard coat film comprising a hard coat layer with excellent hardness (pencil hardness and scratch resistance) can be obtained.

In contrast, the hard coat films of the Comparative Examples, in which the surface free energy of their primer layers does not satisfy the range of the present invention (thirteenth Invention), particularly have inferior initial adhesion and adhesion over time, and their hard coat layers are likely to have adhesion failure. In the hard coat films of the Comparative Examples, the above pencil hardness test could not be properly evaluated due to the adhesion failure of the hard coat layers.

The following Examples 55 to 72 are examples corresponding to the first and eighteenth inventions described above.

Example 55

<Preparation of Primer Layer Paint>

A polyolefin resin (modified polyolefin) "UNISTOLE P-802 (trade name)" (solid content: 22%, produced by Mitsui Chemicals, Inc.) was diluted with butyl acetate/toluene=85/15 (wt. %) until the solid content concentration (paint concentration) was 7.0% to prepare a primer layer paint.

<Preparation of Hard Coat Layer Paint>

Using 100 parts of a urethane acrylate ultraviolet-curing resin "ARTRESIN UN-908 (trade name)" (solid content: 100%, number of (meth)acryloyloxy groups: 9, weight average molecular weight: 3600, produced by Negami Chemical Industrial Co., Ltd.) as a main agent, 3.5 parts of IRGACURE 184 (a photopolymerization initiator, produced by BASF), 2.5 parts of TINUVIN 292 (a hindered amine light stabilizer, produced by BASF), and 0.3 parts of a leveling agent Megaface RS75 (a fluorine leveling agent, produced by DIC Corporation) were diluted with butyl acetate/n-propyl alcohol=50/50 (parts by weight) until the solid content concentration of the ultraviolet-curing resin in the paint was 35%, followed by sufficient stirring to prepare a hard coat layer paint.

<Production of Primer Layer Coating Film>

The above primer layer paint was applied to one surface of Zeonor Film ZF14 (produced by Zeon Corporation) having a thickness of 40 μm as a cycloolefin film using a bar coater (#4), followed by hot-air drying in a drying furnace at 100° C. at a wind speed of 1 m/sec in the furnace for 60 seconds for drying and solidification to form a primer layer with a coating film thickness of 0.4 μm, thereby obtaining a primer layer coating film.

The surface characteristics of the primer layer of the primer layer coating film obtained in this manner were measured for the same items in the same manner as in Example 1 etc. The results were summarized in Table 4 together with other Examples and Comparative Examples.

<Production of Hard Coat Film>

Next, the above hard coat layer paint was applied to the primer layer of a primer layer coating film, which was produced in entirely the same manner as described above, using a bar coater, followed by hot-air drying in a drying furnace at 80° C. for 1 minute to form a coating layer with a coating film thickness of 2.5 μm. This layer was cured using a UV irradiation device set at a height of 60 mm from the coating surface at a UV dose of 180 mJ/cm$^2$ to form a hard coat layer, thereby producing a hard coat film of the present Example.

Example 56

A primer layer coating film and a hard coat film (Example 56) were produced in the same manner as in Example 55, except that the resin mixed with the primer layer paint of Example 55 was changed to a polyolefin resin (modified polyolefin) "UNISTOLE P-901 (trade name)" (solid content: 22%, produced by Mitsui Chemicals, Inc.), and a primer layer paint having a solid content concentration of 7.0% was used. Moreover, the surface characteristics of the primer layer of the primer layer coating film were measured in the same manner as in Example 55.

Example 57

A primer layer coating film and a hard coat film (Example 57) were produced in the same manner as in Example 55, except that the resin mixed with the primer layer paint of Example 55 was changed to a polyolefin resin (modified polyolefin) "UNISTOLE P-902 (trade name)" (solid content: 22%, produced by Mitsui Chemicals, Inc.), and a primer layer paint having a solid content concentration of 7.0% was used. Moreover, the surface characteristics of the primer layer of the primer layer coating film were measured in the same manner as in Example 55.

Example 58

A primer layer coating film and a hard coat film (Example 58) were produced in the same manner as in Example 57, except that the drying conditions after coating the primer layer paint of Example 57 were changed to hot-air drying in a drying furnace at 60° C. at a wind speed of 1 m/sec in the furnace for 60 seconds. Moreover, the surface characteristics of the primer layer of the primer layer coating film were measured in the same manner as in Example 55.

Example 59

A primer layer coating film and a hard coat film (Example 59) were produced in the same manner as in Example 55, except that a primer layer paint mixed with the same polyolefin resin (modified polyolefin) "UNISTOLE P-802 (trade name)" (solid content: 22%, produced by Mitsui Chemicals, Inc.) as that of Example 55 and having a solid content concentration of 5.5% was used, and a primer layer with a coating film thickness of 0.3 μm was formed. Moreover, the surface characteristics of the primer layer of the primer layer coating film were measured in the same manner as in Example 55.

Example 60

A primer layer coating film and a hard coat film (Example 60) were produced in the same manner as in Example 59, except for using a primer layer paint obtained by further mixing 0.5% of a leveling agent Ftergent 602A (a fluorine leveling agent, produced by Neos Co., Ltd.) with the primer layer paint of Example 59. Moreover, the surface characteristics of the primer layer of the primer layer coating film were measured in the same manner as in Example 55.

Example 61

A primer layer coating film and a hard coat film (Example 61) were produced in the same manner as in Example 59, except for using a primer layer paint obtained by further mixing 0.5% of a leveling agent Megaface RS-75 (a fluorine leveling agent, produced by DIC Corporation) with the primer layer paint of Example 59. Moreover, the surface characteristics of the primer layer of the primer layer coating film were measured in the same manner as in Example 55.

Example 62

A primer layer coating film and a hard coat film (Example 62) were produced in the same manner as in Example 55, except that the resin mixed with the primer layer paint of Example 55 was changed to a polyolefin resin (modified polyolefin) "UNISTOLE P-901 (trade name)" (solid content: 22%, produced by Mitsui Chemicals, Inc.), a primer layer paint having a solid content concentration of 5.5% was used, and a primer layer with a coating film thickness of 0.3 µm was formed. Moreover, the surface characteristics of the primer layer of the primer layer coating film were measured in the same manner as in Example 55.

Example 63

A primer layer coating film and a hard coat film (Example 63) were produced in the same manner as in Example 62, except for using a primer layer paint obtained by further mixing 0.5% of a leveling agent Ftergent 602A (a fluorine leveling agent, produced by Neos Co., Ltd.) with the primer layer paint of Example 62. Moreover, the surface characteristics of the primer layer of the primer layer coating film were measured in the same manner as in Example 55.

Example 64

A primer layer coating film and a hard coat film (Example 64) were produced in the same manner as in Example 62, except for using a primer layer paint obtained by further mixing 0.5% of a leveling agent Megaface RS-75 (a fluorine leveling agent, produced by DIC Corporation) with the primer layer paint of Example 62. Moreover, the surface characteristics of the primer layer of the primer layer coating film were measured in the same manner as in Example 55.

Example 65

A primer layer coating film and a hard coat film (Example 65) were produced in the same manner as in Example 55, except that the resin mixed with the primer layer paint of Example 55 was changed to a polyolefin resin (modified polyolefin) "UNISTOLE P-902 (trade name)" (solid content: 22%, produced by Mitsui Chemicals, Inc.), a primer layer paint having a solid content concentration of 5.5% was used, and a primer layer with a coating film thickness of 0.3 µm was formed. Moreover, the surface characteristics of the primer layer of the primer layer coating film were measured in the same manner as in Example 55.

Example 66

A primer layer coating film and a hard coat film (Example 66) were produced in the same manner as in Example 65, except for using a primer layer paint obtained by further mixing 0.5% of a leveling agent Ftergent 602A (a fluorine leveling agent, produced by Neos Co., Ltd.) with the primer layer paint of Example 65. Moreover, the surface characteristics of the primer layer of the primer layer coating film were measured in the same manner as in Example 55.

Example 67

A primer layer coating film and a hard coat film (Example 67) were produced in the same manner as in Example 65, except for using a primer layer paint obtained by further mixing 0.5% of a leveling agent Megaface RS-75 (a fluorine leveling agent, produced by DIC Corporation) with the primer layer paint of Example 65. Moreover, the surface characteristics of the primer layer of the primer layer coating film were measured in the same manner as in Example 55.

Example 68

A primer layer coating film and a hard coat film (Example 68) were produced by forming a primer layer with a coating thickness of 0.2 µm by primer layer coating in the same manner as in Example 55, except that the resin mixed with the primer layer paint of Example 55 was changed to a polyolefin resin (modified polyolefin) "AUROREN S-5419T (trade name)" (solid content: 15%, produced by Nippon Paper Industries Co., Ltd.), and a primer layer paint having a solid content concentration of 3.0% was used. Moreover, the surface characteristics of the primer layer of the primer layer coating film were measured in the same manner as in Example 55.

Example 69

A primer layer coating film and a hard coat film (Example 69) were produced in the same manner as in Example 68, except that the primer layer paint of Example 68 was applied using a bar coater (#6) to form a primer layer with a coating film thickness of 0.3 µm. Moreover, the surface characteristics of the primer layer of the primer layer coating film were measured in the same manner as in Example 55.

Example 70

A primer layer coating film and a hard coat film (Example 70) were produced in the same manner as in Example 61, except that the primer layer paint of Example 61 was applied using a bar coater (#6) to form a primer layer with a coating film thickness of 0.6 µm. Moreover, the surface characteristics of the primer layer of the primer layer coating film were measured in the same manner as in Example 55.

Example 71

A primer layer coating film and a hard coat film (Example 71) were produced in the same manner as in Example 61, except that the primer layer paint of Example 61 was applied using a bar coater (#10) to form a primer layer with a coating film thickness of 1.0 µm. Moreover, the surface characteristics of the primer layer of the primer layer coating film were measured in the same manner as in Example 55.

Example 72

A primer layer coating film and a hard coat film (Example 72) were produced in the same manner as in Example 59, except for using a primer layer paint obtained by further adding 30% of silica fine particle slurry "NanoTek Slurry (trade name)" (silica average particle diameter: 30 nm, a propylene glycol monomethyl ether solvent, solid content:

15%, produced by CIK NanoTek Corporation) to the primer layer paint of Example 59 as solid content. Moreover, the surface characteristics of the primer layer of the primer layer coating film were measured in the same manner as in Example 55.

The following Comparative Examples 9 to 12 are comparative examples for the eighteenth invention described above.

Comparative Example 9

A styrene acrylic resin "ARUFON-UG4040 (trade name)" (solid content: 100%, produced by Toagosei Co., Ltd.) was diluted with butyl acetate/toluene=85/15 (wt. %) until the solid content concentration (paint concentration) was 5.5% to prepare a primer layer paint.

The above primer layer paint was applied to one surface of Zeonor Film ZF14 (produced by Zeon Corporation) having a thickness of 40 μm, which was the same as that of Example 55, using a bar coater (#4), followed by hot-air drying in a drying furnace at 100° C. at a wind speed of 1 m/sec in the furnace for 60 seconds for drying and solidification to form a primer layer with a coating film thickness of 0.3 μm, thereby obtaining a primer layer coating film.

The surface characteristics of the primer layer of the primer layer coating film obtained in this manner were measured in the same manner as in Example 55.

Next, the primer layer of a primer layer coating film, which was produced in entirely the same manner as described above, was coated with the hard coat layer paint of Example 1 in the same manner as in Example 1, followed by curing by UV irradiation to form a hard coat layer, thereby producing a hard coat film of Comparative Example 9.

Comparative Example 10

A primer layer coating film and a hard coat film (Comparative Example 10) were produced in the same manner as in Comparative Example 9, except that the drying conditions after coating the primer layer paint of Comparative Example 9 were changed to hot-air drying in a drying furnace at 60° C. at a wind speed of 1 m/sec in the furnace for 60 seconds. Moreover, the surface characteristics of the primer layer of the primer layer coating film were measured in the same manner as in Example 55.

Comparative Example 11

A primer layer coating film and a hard coat film (Comparative Example 11) were produced in the same manner as in Comparative Example 9, except that the resin mixed with the primer layer paint of Comparative Example 9 was changed to an acrylic resin "THERMOLAC LG-45M-30 (trade name)" (solid content: 30%, produced by Soken Chemical & Engineering Co., Ltd.), and a primer layer paint having a solid content concentration of 5.5% was used. Moreover, the surface characteristics of the primer layer of the primer layer coating film were measured in the same manner as in Example 55.

Comparative Example 12

A primer layer coating film and a hard coat film (Comparative Example 12) were produced in the same manner as in Comparative Example 11, except that the drying conditions after coating the primer layer paint of Comparative Example 11 were changed to hot-air drying in a drying furnace at 60° C. at a wind speed of 1 m/sec in the furnace for 60 seconds. Moreover, the surface characteristics of the primer layer of the primer layer coating film were measured in the same manner as in Example 55.

The hard coat films of the Examples and Comparative Examples produced as described above were each evaluated for the same items in the same manner as in Example 1 etc., and the results were summarized in Table 4.

TABLE 4

| | Primer paint | | | | | Primer layer coating conditions | |
|---|---|---|---|---|---|---|---|
| | Resin | | Additive | | Solid content | Bar coater | |
| | Trade name | Component | Trade name | Additive rate (%) | concentration (%) | coating | Drying conditions |
| Example 55 | UNISTOLE P-802 | Modified polyolefin | — | — | 7.0 | #4 | 100° C., 60 s, wind speed: 1 m/s |
| Example 56 | UNISTOLE P-901 | Modified polyolefin | — | — | 7.0 | #4 | 100° C., 60 s, wind speed: 1 m/s |
| Example 57 | UNISTOLE P-902 | Modified polyolefin | — | — | 7.0 | #4 | 100° C., 60 s, wind speed: 1 m/s |
| Example 58 | UNISTOLE P-902 | Modified polyolefin | — | — | 7.0 | #4 | 60° C., 60 s, wind speed: 1 m/s |
| Example 59 | UNISTOLE P-802 | Modified polyolefin | — | — | 5.5 | #4 | 100° C., 60 s, wind speed: 1 m/s |
| Example 60 | | | Ftergent 602A | 0.5 | | #4 | 100° C., 60 s, wind speed: 1 m/s |
| Example 61 | | | Megaface RS75 | | | #4 | 100° C., 60 s, wind speed: 1 m/s |
| Example 62 | UNISTOLE P-901 | Modified polyolefin | — | — | 5.5 | #4 | 100° C., 60 s, wind speed: 1 m/s |
| Example 63 | | | Ftergent 602A | 0.5 | | #4 | 100° C., 60 s, wind speed: 1 m/s |
| Example 64 | | | Megaface RS75 | | | #4 | 100° C., 60 s, wind speed: 1 m/s |
| Example 65 | UNISTOLE P-902 | Modified polyolefin | — | — | 5.5 | #4 | 100° C., 60 s, wind speed: 1 m/s |
| Example 66 | | | Ftergent 602A | 0.5 | | #4 | 100° C., 60 s, wind speed: 1 m/s |

TABLE 4-continued

| | | | | | | | |
|---|---|---|---|---|---|---|---|
| Example 67 | | | Megaface RS75 | | | #4 | 100° C., 60 s, wind speed: 1 m/s |
| Example 68 | AUROREN S-5419T | Modified polyolefin | — | — | 3.0 | #4 | 100° C., 60 s, wind speed: 1 m/s |
| Example 69 | | | | | | #6 | 100° C., 60 s, wind speed: 1 m/s |
| Example 70 | UNISTOLE P-802 | Modified polyolefin | Megaface RS75 | 0.5 | 5.5 | #6 | 100° C., 60 s, wind speed: 1 m/s |
| Example 71 | | | | | | #10 | 100° C., 60 s, wind speed: 1 m/s |
| Example 72 | UNISTOLE P-802 | Modified polyolefin | NanoTek Slurry (silica average particle diameter: 30 nm) | 30 | 5.5 | #4 | 100° C., 60 s, wind speed: 1 m/s |
| Comparative Example 9 | ARUFON-UG4040 | Styrene acrylic | — | — | 5.5 | #4 | 100° C., 60 s, wind speed: 1 m/s |
| Comparative Example 10 | | | | | | #4 | 60° C., 60 s, wind speed: 1 m/s |
| Comparative Example 11 | THERMOLAC LG-45M-30 | Acrylic polymer | — | — | 5.5 | #4 | 100° C., 60 s, wind speed: 1 m/s |
| Comparative Example 12 | | | | | | #4 | 60° C., 60 s, wind speed: 1 m/s |

| | Primer layer thickness (µm) | Arithmetic average surface roughness [Ra] (nm) | Contact angle (°) Water | Contact angle (°) n-Hexadecane | Surface free energy (mN/m) | Friction coefficient Static friction coefficient | Friction coefficient Dynamic friction coefficient | Static friction coefficient/ dynamic friction coefficient |
|---|---|---|---|---|---|---|---|---|
| Example 55 | 0.4 | 2.6 | 99 | 16 | 27.4 | 1.30 | 1.14 | 1.14 |
| Example 56 | 0.4 | 3.4 | 89 | 29 | 28.1 | 1.15 | 1.03 | 1.12 |
| Example 57 | 0.4 | 4.8 | 100 | 12 | 27.6 | 1.20 | 1.19 | 1.01 |
| Example 58 | 0.4 | 6.3 | 100 | 12 | 27.6 | 1.10 | 1.04 | 1.05 |
| Example 59 | 0.3 | 2.6 | 95 | 14 | 28.4 | 1.42 | 0.96 | 1.48 |
| Example 60 | 0.3 | 2.2 | 83 | 33 | 27.7 | 1.34 | 1.03 | 1.30 |
| Example 61 | 0.3 | 1.9 | 94 | 42 | 23.9 | 1.50 | 1.38 | 1.09 |
| Example 62 | 0.3 | 3.4 | 96 | 24 | 27.0 | 0.98 | 0.41 | 2.38 |
| Example 63 | 0.3 | 2.7 | 77 | 45 | 31.1 | 0.97 | 0.44 | 2.20 |
| Example 64 | 0.3 | 2.6 | 73 | 44 | 33.8 | 0.92 | 0.45 | 2.06 |
| Example 65 | 0.3 | 4.4 | 100 | 12 | 27.7 | 0.92 | 0.64 | 1.45 |
| Example 66 | 0.3 | 3.5 | 94 | 28 | 26.8 | 0.95 | 0.63 | 1.51 |
| Example 67 | 0.3 | 3.0 | 95 | 37 | 24.8 | 0.95 | 0.62 | 1.52 |
| Example 68 | 0.2 | 2.7 | 98 | 12 | 27.9 | 1.31 | 0.67 | 1.97 |
| Example 69 | 0.3 | 4.5 | 97 | 11 | 28.3 | 1.08 | 0.52 | 2.06 |
| Example 70 | 0.6 | 2.3 | 92 | 48 | 26.1 | 1.28 | 1.01 | 1.27 |
| Example 71 | 1.0 | 2.4 | 86 | 48 | 28.3 | 1.32 | 1.02 | 1.29 |
| Example 72 | 0.3 | 3.9 | 100 | 12 | 27.7 | 1.34 | 1.18 | 1.14 |
| Comparative Example 9 | 0.3 | 2.7 | 86 | 11 | 31.3 | 0.54 | 0.45 | 1.20 |
| Comparative Example 10 | 0.3 | 6.6 | 87 | 12 | 30.9 | 0.52 | 0.55 | 0.94 |
| Comparative Example 11 | 0.3 | 2.9 | 72 | 11 | 37.3 | 0.51 | 0.56 | 0.91 |
| Comparative Example 12 | 0.3 | 5.4 | 72 | 12 | 37.7 | 0.58 | 0.58 | 1.00 |

| | Quality Initial adhesion | Quality Adhesion over time | Quality Pencil hardness | Quality Scratch resistance |
|---|---|---|---|---|
| Example 55 | ⊚ | ⊚ | Acceptable | ○ |
| Example 56 | ⊚ | ⊚ | Acceptable | ○ |
| Example 57 | ⊚ | ⊚ | Acceptable | ○ |
| Example 58 | ⊚ | ⊚ | Acceptable | ○ |
| Example 59 | ⊚ | ⊚ | Acceptable | ○ |
| Example 60 | ⊚ | ⊚ | Acceptable | ○ |
| Example 61 | ⊚ | ⊚ | Acceptable | ○ |
| Example 62 | ⊚ | ⊚ | Acceptable | ○ |
| Example 63 | ⊚ | ⊚ | Acceptable | ○ |
| Example 64 | ⊚ | ⊚ | Acceptable | ○ |
| Example 65 | ⊚ | ⊚ | Acceptable | ○ |
| Example 66 | ⊚ | ⊚ | Acceptable | ○ |
| Example 67 | ⊚ | ⊚ | Acceptable | ○ |
| Example 68 | ⊚ | ⊚ | Acceptable | ○ |
| Example 69 | ⊚ | ⊚ | Acceptable | ○ |
| Example 70 | ⊚ | ⊚ | Acceptable | ○ |
| Example 71 | ⊚ | ⊚ | Acceptable | ○ |

TABLE 4-continued

| | | | | |
|---|---|---|---|---|
| Example 72 | ◎ | ◎ | Acceptable | ○ |
| Comparative Example 9 | x | x | Unmeasurable | ○ |
| Comparative Example 10 | x | x | Unmeasurable | ○ |
| Comparative Example 11 | x | x | Unmeasurable | ○ |
| Comparative Example 12 | x | x | Unmeasurable | ○ |

As is clear from the results of Table 4 above, according to the Examples of the present invention, a hard coat film having excellent adhesion, particularly adhesion over time, to a hard coat layer can be obtained using a cycloolefin polymer film as a base material. Moreover, according to the Examples of the present invention, a hard coat film comprising a hard coat layer with excellent hardness (pencil hardness and scratch resistance) can be obtained.

In contrast, the hard coat films of the Comparative Examples, in which the static friction coefficient of their primer layer surfaces does not satisfy the range of the present invention (eighteenth Invention), particularly have inferior initial adhesion and adhesion over time, and their hard coat layers are likely to have adhesion failure. In the hard coat films of the Comparative Examples, the above pencil hardness test could not be properly evaluated due to the adhesion failure of the hard coat layers.

The following Examples 73 to 90 are examples corresponding to the first and twenty-third inventions described above.

Example 73

<Preparation of Primer Layer Paint>

A polyolefin resin (modified polyolefin) "UNISTOLE P-802 (trade name)" (solid content: 22%, produced by Mitsui Chemicals, Inc.) was diluted with butyl acetate/toluene=85/15 (wt. %) until the solid content concentration (paint concentration) was 7.0% to prepare a primer layer paint.

<Preparation of Hard Coat Layer Paint>

Using 100 parts of a urethane acrylate ultraviolet-curing resin "ARTRESIN UN-908 (trade name)" (solid content: 100%, number of (meth)acryloyloxy groups: 9, weight average molecular weight: 3600, produced by Negami Chemical Industrial Co., Ltd.) as a main agent, 3.5 parts of IRGACURE 184 (a photopolymerization initiator, produced by BASF), 2.5 parts of TINUVIN 292 (a hindered amine light stabilizer, produced by BASF), and 0.3 parts of a leveling agent Megaface RS75 (a fluorine leveling agent, produced by DIC Corporation) were diluted with butyl acetate/n-propyl alcohol=50/50 (parts by weight) until the solid content concentration of the ultraviolet-curing resin in the paint was 35%, followed by sufficient stirring to prepare a hard coat layer paint.

<Production of Primer Layer Coating Film>

The above primer layer paint was applied to one surface of Zeonor Film ZF14 (produced by Zeon Corporation) having a thickness of 40 µm as a cycloolefin film using a bar coater (#4), followed by hot-air drying in a drying furnace at 100° C. at a wind speed of 1 m/sec in the furnace for 60 seconds for drying and solidification to form a primer layer with a coating film thickness of 0.4 µm, thereby obtaining a primer layer coating film.

The surface characteristics of the primer layer of the primer layer coating film obtained in this manner were measured for the same items in the same manner as in Example 1 etc. The results were summarized in Table 5 together with other Examples.

<Production of Hard Coat Film>

Next, the above hard coat layer paint was applied to the primer layer of a primer layer coating film, which was produced in entirely the same manner as described above, using a bar coater, followed by hot-air drying in a drying furnace at 80° C. for 1 minute to form a coating layer with a coating film thickness of 2.5 µm. This layer was cured using a UV irradiation device set at a height of 60 mm from the coating surface at a UV dose of 180 mJ/cm$^2$ to form a hard coat layer, thereby producing a hard coat film of the present Example.

Example 74

A primer layer coating film and a hard coat film (Example 74) were produced in the same manner as in Example 73, except that the resin mixed with the primer layer paint of Example 73 was changed to a polyolefin resin (modified polyolefin) "UNISTOLE P-901 (trade name)" (solid content: 22%, produced by Mitsui Chemicals, Inc.), and a primer layer paint having a solid content concentration of 7.0% was used. Moreover, the surface characteristics of the primer layer of the primer layer coating film were measured in the same manner as in Example 73.

Example 75

A primer layer coating film and a hard coat film (Example 75) were produced in the same manner as in Example 73, except that the resin mixed with the primer layer paint of Example 73 was changed to a polyolefin resin (modified polyolefin) "UNISTOLE P-902 (trade name)" (solid content: 22%, produced by Mitsui Chemicals, Inc.), and a primer layer paint having a solid content concentration of 7.0% was used. Moreover, the surface characteristics of the primer layer of the primer layer coating film were measured in the same manner as in Example 73.

Example 76

A primer layer coating film and a hard coat film (Example 76) were produced in the same manner as in Example 75, except that the drying conditions after coating the primer layer paint of Example 75 were changed to hot-air drying in a drying furnace at 60° C. at a wind speed of 1 m/sec in the furnace for 60 seconds. Moreover, the surface characteristics of the primer layer of the primer layer coating film were measured in the same manner as in Example 73.

Example 77

A primer layer coating film and a hard coat film (Example 77) were produced in the same manner as in Example 73, except that a primer layer paint mixed with the same polyolefin resin (modified polyolefin) "UNISTOLE P-802 (trade name)" (solid content: 22%, produced by Mitsui Chemicals, Inc.) as that of Example 73 and having a solid content concentration of 5.5% was used, and a primer layer with a coating film thickness of 0.3 µm was formed. Moreover, the surface characteristics of the primer layer of the primer layer coating film were measured in the same manner as in Example 73.

Example 78

A primer layer coating film and a hard coat film (Example 78) were produced in the same manner as in Example 77, except for using a primer layer paint obtained by further mixing 0.5% of a leveling agent Ftergent 602A (a fluorine leveling agent, produced by Neos Co., Ltd.) with the primer layer paint of Example 77. Moreover, the surface characteristics of the primer layer of the primer layer coating film were measured in the same manner as in Example 73.

Example 79

A primer layer coating film and a hard coat film (Example 79) were produced in the same manner as in Example 77, except for using a primer layer paint obtained by further mixing 0.5% of a leveling agent Megaface RS-75 (a fluorine leveling agent, produced by DIC Corporation) with the primer layer paint of Example 77. Moreover, the surface characteristics of the primer layer of the primer layer coating film were measured in the same manner as in Example 73.

Example 80

A primer layer coating film and a hard coat film (Example 80) were produced in the same manner as in Example 73, except that the resin mixed with the primer layer paint of Example 73 was changed to a polyolefin resin (modified polyolefin) "UNISTOLE P-901 (trade name)" (solid content: 22%, produced by Mitsui Chemicals, Inc.), a primer layer paint having a solid content concentration of 5.5% was used, and a primer layer with a coating film thickness of 0.3 µm was formed. Moreover, the surface characteristics of the primer layer of the primer layer coating film were measured in the same manner as in Example 73.

Example 81

A primer layer coating film and a hard coat film (Example 81) were produced in the same manner as in Example 80, except for using a primer layer paint obtained by further mixing 0.5% of a leveling agent Ftergent 602A (a fluorine leveling agent, produced by Neos Co., Ltd.) with the primer layer paint of Example 80. Moreover, the surface characteristics of the primer layer of the primer layer coating film were measured in the same manner as in Example 73.

Example 82

A primer layer coating film and a hard coat film (Example 82) were produced in the same manner as in Example 80, except for using a primer layer paint obtained by further mixing 0.5% of a leveling agent Megaface RS-75 (a fluorine leveling agent, produced by DIC Corporation) with the primer layer paint of Example 80. Moreover, the surface characteristics of the primer layer of the primer layer coating film were measured in the same manner as in Example 73.

Example 83

A primer layer coating film and a hard coat film (Example 83) were produced in the same manner as in Example 73, except that the resin mixed with the primer layer paint of Example 73 was changed to a polyolefin resin (modified polyolefin) "UNISTOLE P-902 (trade name)" (solid content: 22%, produced by Mitsui Chemicals, Inc.), a primer layer paint having a solid content concentration of 5.5% was used, and a primer layer with a coating film thickness of 0.3 µm was formed. Moreover, the surface characteristics of the primer layer of the primer layer coating film were measured in the same manner as in Example 73.

Example 84

A primer layer coating film and a hard coat film (Example 84) were produced in the same manner as in Example 83, except for using a primer layer paint obtained by further mixing 0.5% of a leveling agent Ftergent 602A (a fluorine leveling agent, produced by Neos Co., Ltd.) with the primer layer paint of Example 83. Moreover, the surface characteristics of the primer layer of the primer layer coating film were measured in the same manner as in Example 73.

Example 85

A primer layer coating film and a hard coat film (Example 85) were produced in the same manner as in Example 83, except for using a primer layer paint obtained by further mixing 0.5% of a leveling agent Megaface RS-75 (a fluorine leveling agent, produced by DIC Corporation) with the primer layer paint of Example 83. Moreover, the surface characteristics of the primer layer of the primer layer coating film were measured in the same manner as in Example 73.

Example 86

A primer layer coating film and a hard coat film (Example 86) were produced by forming a primer layer with a coating thickness of 0.2 µm by primer layer coating in the same manner as in Example 73, except that the resin mixed with the primer layer paint of Example 73 was changed to a polyolefin resin (modified polyolefin) "AUROREN S-5419T (trade name)" (solid content: 15%, produced by Nippon Paper Industries Co., Ltd.), and a primer layer paint having a solid content concentration of 3.0% was used. Moreover, the surface characteristics of the primer layer of the primer layer coating film were measured in the same manner as in Example 73.

Example 87

A primer layer coating film and a hard coat film (Example 87) were produced in the same manner as in Example 86, except that the primer layer paint of Example 86 was applied using a bar coater (#6) to form a primer layer with a coating film thickness of 0.3 µm. Moreover, the surface characteristics of the primer layer of the primer layer coating film were measured in the same manner as in Example 73.

Example 88

A primer layer coating film and a hard coat film (Example 88) were produced in the same manner as in Example 79, except that the primer layer paint of Example 79 was applied using a bar coater (#6) to form a primer layer with a coating film thickness of 0.6 μm. Moreover, the surface characteristics of the primer layer of the primer layer coating film were measured in the same manner as in Example 73.

Example 89

A primer layer coating film and a hard coat film (Example 89) were produced in the same manner as in Example 79, except that the primer layer paint of Example 79 was applied using a bar coater (#10) to form a primer layer with a coating film thickness of 1.0 μm. Moreover, the surface characteristics of the primer layer of the primer layer coating film were measured in the same manner as in Example 73.

Example 90

A primer layer coating film and a hard coat film (Example 90) were produced in the same manner as in Example 77, except for using a primer layer paint obtained by further adding 30% of silica fine particle slurry "NanoTek Slurry (trade name)" (silica average particle diameter: 30 nm, a propylene glycol monomethyl ether solvent, solid content: 15%, produced by CIK NanoTek Corporation) to the primer layer paint of Example 77 as solid content. Moreover, the surface characteristics of the primer layer of the primer layer coating film were measured in the same manner as in Example 73.

The hard coat films of the Examples produced as described above were each evaluated for the same items in the same manner as in Example 1 etc., and the results were summarized in Table 5.

TABLE 5

| | Primer paint | | | | | Primer layer coating conditions | |
| --- | --- | --- | --- | --- | --- | --- | --- |
| | Resin | | Additive | | Solid content | Bar coater | |
| | Trade name | Component | Trade name | Additive rate (%) | concentration (%) | coating | Drying conditions |
| Example 73 | UNISTOLE P-802 | Modified polyolefin | — | — | 7.0 | #4 | 100° C., 60 s, wind speed: 1 m/s |
| Example 74 | UNISTOLE P-901 | Modified polyolefin | — | — | 7.0 | #4 | 100° C., 60 s, wind speed: 1 m/s |
| Example 75 | UNISTOLE P-902 | Modified polyolefin | — | — | 7.0 | #4 | 100° C., 60 s, wind speed: 1 m/s |
| Example 76 | UNISTOLE P-902 | Modified polyolefin | — | — | 7.0 | #4 | 60° C., 60 s, wind speed: 1 m/s |
| Example 77 | UNISTOLE P-802 | Modified polyolefin | — | — | 5.5 | #4 | 100° C., 60 s, wind speed: 1 m/s |
| Example 78 | | | Ftergent 602A | 0.5 | | #4 | 100° C., 60 s, wind speed: 1 m/s |
| Example 79 | | | Megaface RS75 | | | #4 | 100° C., 60 s, wind speed: 1 m/s |
| Example 80 | UNISTOLE P-901 | Modified polyolefin | | | 5.5 | #4 | 100° C., 60 s, wind speed: 1 m/s |
| Example 81 | | | Ftergent 602A | 0.5 | | #4 | 100° C., 60 s, wind speed: 1 m/s |
| Example 82 | | | Megaface RS75 | | | #4 | 100° C., 60 s, wind speed: 1 m/s |
| Example 83 | UNISTOLE P-902 | Modified polyolefin | — | | 5.5 | #4 | 100° C., 60 s, wind speed: 1 m/s |
| Example 84 | | | Ftergent 602A | 0.5 | | #4 | 100° C., 60 s, wind speed: 1 m/s |
| Example 85 | | | Megaface RS75 | | | #4 | 100° C., 60 s, wind speed: 1 m/s |
| Example 86 | AUROREN S-5419T | Modified polyolefin | — | — | 3.0 | #4 | 100° C., 60 s, wind speed: 1 m/s |
| Example 87 | | | | | | #6 | 100° C., 60 s, wind speed: 1 m/s |
| Example 88 | UNISTOLE P-802 | Modified polyolefin | Megaface RS75 | 0.5 | 5.5 | #6 | 100° C., 60 s, wind speed: 1 m/s |
| Example 89 | | | | | | #10 | 100° C., 60 s, wind speed: 1 m/s |
| Example 90 | UNISTOLE P-802 | Modified polyolefin | NanoTek Slurry (silica average particle diameter: 30 nm) | 30 | 5.5 | #4 | 100° C., 60 s, wind speed: 1 m/s |

TABLE 5-continued

|  | Primer layer thickness (μm) | Arithmetic average surface roughness [Ra] (nm) | Contact angle (°) Water | Contact angle (°) n-Hexadecane | Surface free energy (mN/m) | Friction coefficient Static friction coefficient | Friction coefficient Dynamic friction coefficient | Friction coefficient Static friction coefficient/ dynamic friction coefficient |
|---|---|---|---|---|---|---|---|---|
| Example 73 | 0.4 | 2.6 | 99 | 16 | 27.4 | 1.30 | 1.14 | 1.14 |
| Example 74 | 0.4 | 3.4 | 89 | 29 | 28.1 | 1.15 | 1.03 | 1.12 |
| Example 75 | 0.4 | 4.8 | 100 | 12 | 27.6 | 1.20 | 1.19 | 1.01 |
| Example 76 | 0.4 | 6.3 | 100 | 12 | 27.6 | 1.10 | 1.04 | 1.05 |
| Example 77 | 0.3 | 2.6 | 95 | 14 | 28.4 | 1.42 | 0.96 | 1.48 |
| Example 78 | 0.3 | 2.2 | 83 | 33 | 27.7 | 1.34 | 1.03 | 1.30 |
| Example 79 | 0.3 | 1.9 | 94 | 42 | 23.9 | 1.50 | 1.38 | 1.09 |
| Example 80 | 0.3 | 3.4 | 96 | 24 | 27.0 | 0.98 | 0.41 | 2.38 |
| Example 81 | 0.3 | 2.7 | 77 | 45 | 31.1 | 0.97 | 0.44 | 2.20 |
| Example 82 | 0.3 | 2.6 | 73 | 44 | 33.8 | 0.92 | 0.45 | 2.06 |
| Example 83 | 0.3 | 4.4 | 100 | 12 | 27.7 | 0.92 | 0.64 | 1.45 |
| Example 84 | 0.3 | 3.5 | 94 | 28 | 26.8 | 0.95 | 0.63 | 1.51 |
| Example 85 | 0.3 | 3.0 | 95 | 37 | 24.8 | 0.95 | 0.62 | 1.52 |
| Example 86 | 0.2 | 2.7 | 98 | 12 | 27.9 | 1.31 | 0.67 | 1.97 |
| Example 87 | 0.3 | 4.5 | 97 | 11 | 28.3 | 1.08 | 0.52 | 2.06 |
| Example 88 | 0.6 | 2.3 | 92 | 48 | 26.1 | 1.28 | 1.01 | 1.27 |
| Example 89 | 1.0 | 2.4 | 86 | 48 | 28.3 | 1.32 | 1.02 | 1.29 |
| Example 90 | 0.3 | 3.9 | 100 | 12 | 27.7 | 1.34 | 1.18 | 1.14 |

|  | Quality Initial adhesion | Quality Adhesion over time | Quality Pencil hardness | Quality Scratch resistance |
|---|---|---|---|---|
| Example 73 | ◎ | ◎ | Acceptable | ○ |
| Example 74 | ◎ | ◎ | Acceptable | ○ |
| Example 75 | ◎ | ◎ | Acceptable | ○ |
| Example 76 | ◎ | ◎ | Acceptable | ○ |
| Example 77 | ◎ | ◎ | Acceptable | ○ |
| Example 78 | ◎ | ◎ | Acceptable | ○ |
| Example 79 | ◎ | ◎ | Acceptable | ○ |
| Example 80 | ◎ | ◎ | Acceptable | ○ |
| Example 81 | ◎ | ◎ | Acceptable | ○ |
| Example 82 | ◎ | ◎ | Acceptable | ○ |
| Example 83 | ◎ | ◎ | Acceptable | ○ |
| Example 84 | ◎ | ◎ | Acceptable | ○ |
| Example 85 | ◎ | ◎ | Acceptable | ○ |
| Example 86 | ◎ | ◎ | Acceptable | ○ |
| Example 87 | ◎ | ◎ | Acceptable | ○ |
| Example 88 | ◎ | ◎ | Acceptable | ○ |
| Example 89 | ◎ | ◎ | Acceptable | ○ |
| Example 90 | ◎ | ◎ | Acceptable | ○ |

As is clear from the results of Table 5 above, according to the Examples of the present invention, a hard coat film having excellent adhesion, particularly adhesion over time, to a hard coat layer can be obtained using a cycloolefin polymer film as a base material. Moreover, according to the Examples of the present invention, a hard coat film comprising a hard coat layer with excellent hardness (pencil hardness and scratch resistance) can be obtained.

The invention claimed is:

1. A hard coat film comprising a hard coat layer containing an ionizing radiation curable resin laminated on at least one surface of a cycloolefin polymer base film via a primer layer containing a modified polyolefin resin,
   wherein the primer layer is obtained by applying a primer layer paint on the cycloolefin polymer base film to form a primer layer coating film, followed by drying at 100° C. for 60 seconds to form the primer layer, the primer layer having a primer layer coating film thickness in the range of from 0.2 μm to 0.4 μm,
   wherein the primer layer has an arithmetic average surface roughness (Ra) in the range of 1.9 nm to 4.8 nm, and a surface of the primer layer has a static friction coefficient in the range of 0.92 to 1.42,
   wherein the surface of the primer layer has a ratio of static friction coefficient to dynamic friction coefficient (static friction coefficient/dynamic friction coefficient) in the range of 1.01 to 2.38,
   wherein the primer layer has a surface free energy in the range of 23.9 mN/m to 33.8 mN/m, and
   wherein the surface of the primer layer has a water contact angle of 110 degrees or less.

2. The hard coat film according to claim 1, wherein the hard coat layer contains, as the ionizing radiation curable resin, a polyfunctional acrylate having three or more (meth) acryloyloxy groups per molecule.

3. A method for producing a hard coat film according to claim 1, having a hard coat layer containing an ionizing radiation curable resin on a cycloolefin polymer base film via a primer layer containing a modified polyolefin resin, the method comprising:
   applying a primer layer paint to the cycloolefin polymer base film to form a primer coating film, followed by drying at 100° C. for 60 seconds to form the primer layer, the primer layer having a primer layer coating film thickness in the range of from 0.2 μm to 0.4 μm, wherein the primer layer has an arithmetic average surface roughness (Ra) in the range of 1.9 nm to 4.8 nm, and a surface of the primer layer has a static friction coefficient in the range of 0.92 to 1.42;

wherein the surface of the primer layer has a ratio of static friction coefficient to dynamic friction coefficient (static friction coefficient/dynamic friction coefficient) in the range of 1.01 to 2.38, wherein the primer layer has a surface free energy in the range of 23.9 mN/m to 33.8 mN/m, wherein the surface of the primer layer has a water contact angle of 110 degrees or less, then applying a hard coat layer paint containing an ionizing radiation curable resin to the primer layer, followed by drying to form the hard coat layer; and then performing ionizing radiation irradiation.

4. The method for producing a hard coat film according to claim 3, wherein the hard coat layer contains, as the ionizing radiation curable resin, a polyfunctional acrylate having three or more (meth)acryloyloxy groups per molecule.

\* \* \* \* \*